US008856862B2

(12) United States Patent
Dimitrakos et al.

(10) Patent No.: US 8,856,862 B2
(45) Date of Patent: Oct. 7, 2014

(54) MESSAGE PROCESSING METHODS AND SYSTEMS

(75) Inventors: Theo Dimitrakos, Colchester (GB); Leonid Titkov, London (GB); Andreas Maierhofer, Ipswich (GB)

(73) Assignee: British Telecommunications public limited company, London (GB)

( * ) Notice: Subject to any disclaimer, the term of this patent is extended or adjusted under 35 U.S.C. 154(b) by 913 days.

(21) Appl. No.: 12/280,887

(22) PCT Filed: Nov. 1, 2006

(86) PCT No.: PCT/GB2006/004088
§ 371 (c)(1),
(2), (4) Date: Aug. 27, 2008

(87) PCT Pub. No.: WO2007/099276
PCT Pub. Date: Sep. 7, 2007

(65) Prior Publication Data
US 2009/0235325 A1    Sep. 17, 2009

(30) Foreign Application Priority Data

Mar. 2, 2006  (EP) .................................... 06251131
Sep. 4, 2006  (EP) .................................... 06254585

(51) Int. Cl.
| | |
|---|---|
| H04L 29/06 | (2006.01) |
| G06F 11/07 | (2006.01) |
| G06F 9/54 | (2006.01) |
| H04L 12/751 | (2013.01) |
| G06F 11/14 | (2006.01) |

(52) U.S. Cl.
CPC ............ G06F 9/546 (2013.01); G06F 11/0715 (2013.01); *G06F 11/1482* (2013.01); H04L 45/02 (2013.01)
USPC .............................................. 726/1; 709/203

(58) Field of Classification Search
CPC .... H04L 67/02; G06F 11/715; G06F 11/1482
USPC ................................................................ 726/1
See application file for complete search history.

(56) References Cited

U.S. PATENT DOCUMENTS

| | | |
|---|---|---|
| 6,185,678 B1 | 2/2001 | Arbaugh et al. |
| 6,807,636 B2 | 10/2004 | Hartman et al. |

(Continued)

FOREIGN PATENT DOCUMENTS

| | | |
|---|---|---|
| WO | 00/45256 | 8/2000 |
| WO | 03/091895 | 11/2003 |

(Continued)

OTHER PUBLICATIONS

International Search Report for PCT/GB2006/004088, mailed Feb. 20, 2007.
Christensen et al., Web Services Description Language (WSDL) 1.1, W3C Note Mar. 15, 2001, 31 pgs.
OASIS Web Services Resource Properties 1.2 (WS-ResourceProperties), Working Draft 04, Jun. 10, 2004, 52 pgs.

(Continued)

*Primary Examiner* — Hadi Armouche
*Assistant Examiner* — Dao Ho
(74) *Attorney, Agent, or Firm* — Nixon & Vanderhye P.C.

(57) ABSTRACT

Methods and apparatus for controlling the operation of a distributed application using message interception techniques are disclosed. The message interception software is independent of the software components making up the distributed application. The message interception software processes messages by carrying out a series of actions set out in an interceptor chain configuration policy, that policy being selected on the basis of the contents of the intercepted message. The interceptor chain configuration policy is divided into a separate enforcement configuration policy which dictates what actions should be carried out on a message and in what order, and an interceptor reference policy which indicates references to interceptors which are suitable for carrying out the actions specified in the enforcement configuration policy. In this way, the behavior of the message interception software (and thus the distributed application) can be updated while both the interception software and the distributed application are running without requiring the person updating the behavior of the message interception software to deal with esoteric references to interceptor software routines.

31 Claims, 14 Drawing Sheets

(56) References Cited

U.S. PATENT DOCUMENTS

| | | | |
|---|---|---|---|
| 6,944,643 B1* | 9/2005 | Ahmad et al. | 709/203 |
| 6,957,330 B1 | 10/2005 | Hughes et al. | |
| 6,973,657 B1* | 12/2005 | Ahmad et al. | 719/315 |
| 2002/0067818 A1* | 6/2002 | Barathan et al. | 379/219 |
| 2002/0169987 A1 | 11/2002 | Meushaw et al. | |
| 2003/0004746 A1 | 1/2003 | Kheirolomoom et al. | |
| 2003/0056093 A1 | 3/2003 | Huitema et al. | |
| 2003/0131245 A1* | 7/2003 | Linderman | 713/176 |
| 2003/0196083 A1 | 10/2003 | Grawrock et al. | |
| 2004/0010682 A1 | 1/2004 | Foster et al. | |
| 2004/0039803 A1* | 2/2004 | Law | 709/223 |
| 2004/0131187 A1 | 7/2004 | Takao et al. | |
| 2004/0136386 A1 | 7/2004 | Miller et al. | |
| 2004/0167984 A1 | 8/2004 | Herrmann | |
| 2004/0193912 A1 | 9/2004 | Li et al. | |
| 2004/0249950 A1* | 12/2004 | Christensen et al. | 709/227 |
| 2004/0267901 A1 | 12/2004 | Gomez | |
| 2005/0027837 A1 | 2/2005 | Roese et al. | |
| 2005/0044197 A1 | 2/2005 | Lai | |
| 2005/0081038 A1 | 4/2005 | Modiano et al. | |
| 2005/0081055 A1 | 4/2005 | Patrick et al. | |
| 2005/0086197 A1 | 4/2005 | Boubez et al. | |
| 2005/0138416 A1 | 6/2005 | Qian et al. | |
| 2005/0152542 A1 | 7/2005 | Zheng et al. | |
| 2005/0160289 A1* | 7/2005 | Shay | 713/201 |
| 2005/0169461 A1 | 8/2005 | Canard et al. | |
| 2005/0172133 A1 | 8/2005 | Brumme et al. | |
| 2005/0183021 A1 | 8/2005 | Allen et al. | |
| 2005/0246552 A1 | 11/2005 | Bade et al. | |
| 2006/0013400 A1 | 1/2006 | Sutton et al. | |
| 2006/0015728 A1* | 1/2006 | Ballinger et al. | 713/172 |
| 2006/0041669 A1 | 2/2006 | Bemmel et al. | |
| 2006/0048210 A1* | 3/2006 | Hildre et al. | 726/1 |
| 2006/0069662 A1 | 3/2006 | Laborczfalvi et al. | |
| 2006/0256107 A1 | 11/2006 | Scarlata et al. | |
| 2007/0124797 A1* | 5/2007 | Gupta et al. | 726/1 |
| 2007/0239987 A1 | 10/2007 | Hoole et al. | |
| 2008/0022385 A1 | 1/2008 | Crowell et al. | |
| 2008/0148377 A1 | 6/2008 | Kumar et al. | |
| 2010/0138674 A1 | 6/2010 | Dimitrakos et al. | |

FOREIGN PATENT DOCUMENTS

| | | |
|---|---|---|
| WO | 2005/096193 | 10/2005 |
| WO | 2006/011943 | 2/2006 |
| WO | 2007/099276 | 9/2007 |

OTHER PUBLICATIONS

Box, Don et al., "Web Services Addressing (WS-Addressing)", W3C Member Submission Aug. 10, 2004, 23 pgs.
SOAP Version 1.2 Part 1: Messaging Framework, W3C Recommendation Jun. 24, 2003, 52 pgs.
Fielding, R. et al., Hypertext Transfer Protocol—HTTP/1.1 Memo, The Internet Society 1999, 114 pgs.
Berners-Lee, T. et al., Uniform Resource Identifier (URI): Generic Syntax Memo, The Internet Society 2005, 61 pgs.
Extensible Markup Language (XML) 1.0 (Third Edition), W3C Recommendation Feb. 4, 2004, 59 pgs.
OASIS Web Services Distributed Management: Management Using Web Services (MUWS 1.0) Part 1, OASIS Standard, Mar. 9, 2005, 30 pgs.
Tuecke, S. et al., "Web Services Base Faults (WS-BaseFaults)", Version 1.0, Mar. 31, 2004, 11 pgs.
OASIS Web Services Base Notification 1.3 (WS-BaseNotification), Public Review Draft 02, Nov. 28, 2005, 64 pgs.
Web Services Message Exchange Patterns, Draft Jul. 22, 2002, 3 pgs.
Service-oriented architecture (SOA) definition, article, Barry & Associates, date unknown, 5 pgs.
World Wide Web Consortium Suports the IETF URI Standard and IRI Proposed Standard, URI Specification Updated, IRIs Allow Internationalized Web Addressing, Jan. 26, 2005, 3 pgs.
OASIS Web Services Topics 1.3 (WS-Topics), Public Review Draft 01, Dec. 16, 2005, 39 pgs.
OASIS Web Services Brokered Notification 1.3 (WS-BrokeredNotification), Public Review Draft 02, Nov. 28, 2005, 45 pgs.
Alexey Orlov et al., "Basic TrustCom reference implementation", Deliverable 19, Version 1.0, Sep. 2005, 186 pgs.
Birrell, A. D. and Nelson, B. J., "Implementing Remote Procedure Calls", Xerox Palo Alto Research Center, ACM Transactions on Computer Systems, vol. 2, No. 1, Feb. 1984, pp. 39-59.
Common Object Request Broker Architecture: Core Specification, CORBA Specification, Mar. 2004, Version 3.0-3, 1152 pgs.
Wilson et al., CCLRC, RAL-TR-2006-009, State of the art survey on trust, security and contract management in web services and Grid computing, Mar. 2006, 441 pgs.
Ryutov, T. and Neuman, C., "The Specification and Enforcement of Advanced Security Policies", Proceedings of the Third International Workshop on Policies for Distributed Systems and Networks (POLICY '02), 2002, pp. 128-138.
Dimitrakos, T. et al., "Policy-Driven Access Control and a Distributed Firewall Architecture", Proceedings of the Third International Workshop on Policies for Distributed Systems and Networks (POLICY '02), 2002, pp. 228-231.
International Search Report for PCT/GB2008/001079, mailed May 6, 2008.
Written Opinion of the Int'l Searching Authority for PCT/GB2007/001079, mailed May 6, 2008.
Berger, S et al, "IBM Research Report RC23879, VtPM: Virtualizing the Trusted Platform Module", Internet Citation, (Feb. 14, 2006).
Gosling, J. et al., "The Java Language Environment. A White Paper", Sun Delivers Java Workshop, (Oct. 1995), pp. 1 and 4-85.
Vecellio et al., "Infrastructure-based Mediation for Enforcement of Policies in Composed and Federated Application", Jul. 21, 2003, pp. 1-8, XP002388699.
Steven M. Bellovin, "Distributed Firewalls", Nov. 1999 issue of ;login, pp. 37-39.
Berger, Stefan et al., "vTPM: Virtualizing the Trusted Platform Module", IBM T. J. Watson Research Center, NY, Usenix Association, Security '06, 15th USENIX Security Symposium, 16 pgs.
TCG Specification Architecture Overview, Specification Revision 1.2, Apr. 28, 2004, 54 pgs.
TCG Generic Server Specification, Specification Version 1.0, Revision 0.8, Mar. 23, 2005, 42 pgs.
OASIS Web Services Security: SOAP Message Security 1.0 (WS-Security 2004), OASIS Standard 200401, Mar. 15, 2004, 56 pgs.
Reiner, Sailer et al., "Proceedings of the 13th USENIX Security Symposium", San Diego, CA, Aug. 9-13, 2004, 17 pgs.
Wenbo Mao et al., "Innovations for Grid Security from Trusted Computing", Hewlett-Packard Laboratories, Bristol, UK; Huazhong University of Science and Technology, Wu Han, China; Oxford University Software Engineering Centre, Oxford, UK, Jun. 7, 2005, 17 pgs.
John Marchesini et al., "Experimenting with TCPA/TCG Hardware, Or: How I Learned to Stop Worrying and Love the Bear", Computer Science Technical Report TR2003-476, Dec. 15, 2003, 20 pgs.
James Gosling and Henry McGilton, "The Java Language Environment", A White Paper, Sun Microsystems Computer Company, Oct. 1995, 86 pgs.
Bruce Schneier, Crypto-Gram Newsletter, Aug. 15, 2002, 10 pgs. Retrieved from http://www.schneier.com/crypto-gram-0208.html.
Web page—"Trusted Computing" Frequently Asked Questions, Version 1.1 (Aug. 2003), 16 pgs. Retrieved from http://www.cl.cam.ac.uk/~rja14/tcpa-faq.html.
Jon Oltsik, "Trusted Enterprise Security", How the Trusted Computing Group (TCG) Will Advance Enterprise Security, White Paper, ESg Enterprise Strategy Group, Jan. 2006, 13 pgs.
Office Action (8 pgs.) dated Mar. 7, 2012 issued in co-pending U.S. Appl. No. 12/594,045.
Dimitrakos, T., "Research Challenges for the Convergence of SOA Platforms and Next Generation Networking," British Telecommunication plc. 2007, 24 pages.
Djordjevic et al., "Virtualised Trusted Computing Platform for Adaptive Security Enforcement of Web Services Interactions," 2007 IEEE International Conference on Web Services (ICWS 2007), 8 pages.

(56) References Cited

OTHER PUBLICATIONS

Maierhofer et al., "Extendabel and Adaptive Message-Level Security Enforcement Framework," In Proceedings of the International Conference on Networking and Services, (ICNS '06), Jul. 2006, ISBN: 0-7695-2622-5, 10 pages.
Figueiredo et al., "Resource Virtualization Renaissance," IEEE Computer Magazine, May 2005, pp. 28-31.
Jiang et al., "SODA: A Service-On-Demand Architecture for Application Service Hosting Utility Platforms," Proceedings of the 12th IEEE International Symipsium on High Performance Distributed Computing (HPDC'03), 10 pages.
Mao et al., "Daonity-Grid Security with Behaviour Conformity from Trusted Computing," In Proceedings of the First ACM Workshop on Scalable Trusted Computing, ISBN: 1-59593-548-7, Nov. 3, 2006, pp. 43-46.
Creasy, R.J., "The Origin of the VM/370 Time-Sharing System," IBM J. Res. Develop., vol. 25, No. 5, Sep. 1981, pp. 483-490.
Goldberg, Robert P., "Survey of Virtual Machine Research," IEEE Computer Magazine, Jun. 1974, pp. 34-45.
Nanda et al., "A Survey on Virtualization Technologies," Research Proficiency Report, Stony Brook, ECSL-TR-179, Feb. 2005, pp. 1-42.
Leiva et al., "A Grid Computing for Online Games," In proceedings of Game Design and Technology Workshop 2006 (GDTW'06), Nov. 2006, pp. 1-5.
Nair et al., "Secure Web Service Federation Management Using TPM Virtualisation," ACM, SWS '07, Nov. 2, 2006, pp. 73-80.
"Virtual Trusted Platform Module", IBM article, May 2, 2006 (4 pgs.).
Web page "The Xen virtual machine monitor", University of Cambridge Computer Laboratory, 2008 (2 pgs.).
"Xen ups the security ante", 2006, (2 pgs.) downloaded from www.vnnnet.com/articles/print/2137789.
Roger L. Kay, President, EndpointTechnologies Associates "Trusted Computing is Reals and it's Here", Jan. 29, 2007, 6 pgs.
Microsoft White Paper entitled "Trusted Platform Module Services in Windows Longhorn", Apr. 25, 2005 (10 pgs.).
Bray et al., Extensible Markup Language (XML) 1.0 (Third Edition), W3C Recommendation Feb. 4, 2004, 35 pgs.
Office Action mailed Jan. 17, 2013 in U.S. Appl. No. 12/280,885.
Office Action issued May 3, 2012 in U.S. Appl. No. 12/280,885.
Djordjevic et al., "Dynamic security perimeters for inter-enterprise service integration"; Future Generation Computer Systems; vol. 23, No. 4; (Feb. 2, 2007); pp. 633-657.
Patrick McDaniel et al.; 1999; "Antigone: a flexible framework for secure group communication"; In Proceedings of the 9th Conference on USENIX Security Symposium—vol. 8 (SSYM'99); vol. 8; USENIX Association. Berkeley, CA, USA pp. 99-114.
Hongbin Liu, Geoffrey Fox, Marlon Pierce, Shrideep Pallickara; A Multi-party Implementation of WS-SecureConversation Technical Report, Apr. 2005., 13 pgs.
State of the Art Evaluation—phase 1, WP10 State of the Art Deliverable; Imperial College London, Jun. 10, 2004, Issue 1; 374 pgs. (with emphasis on pp. 283-290).
TCG Specification Architecture Overview, Specification Revision 1.2, Apr. 28, 2004., 54 pgs.
Anderson, R. et al.; "Cryptographic Processors—A Survey"; Proceedings of the IEEE; vol. 94, No. 2; pp. 357-369; Feb. 2006.
N. Asokan and P. Ginzboorg; "Key agreement in ad hoc networks"; Computer Communications; vol. 23; Issue 17; Nov. 1, 2000; pp. 1627-1637.
T. Garfinkel et al.; "Terra: a virtual machine-based platform for trusted computing"; SIGOPS Oper. Syst. Rev. 37, 5 (Oct. 2003)., 14 pgs.
M. Rosenblum and T. Garfinkel; "Virtual machine monitors: current technology and future trends"; *Computer*; vol. 38, No. 5; pp. 39-47; May 2005.
Book Chapter; Authors: L. Chen and T. Pedersen; Editor: De Santis, Alfredo; Primary Title: New group signature schemes: Book Title: Advances in Cryptology—EUROCRYPT'94; Book Series Title: Lecture Notes in Computer Science; Copyright: 1995; Publisher: Springer Berlin/Heidelberg; Isbn: 978-3-540-60176-0; Subject: Computer Science; Start p. 171; End p. 181; vol. 950.
Luis Felipe Cabrera et al.; Web Services Coordination (WS-Coordination); Version 1.0; Aug. 2005; 23 pgs.
B. Lehane et al.; Shared RSA key generation in a mobile ad hoc network; In Proceedings of the 2004 IEEE conference on Military communication—vol. 11 (MILCOM '03); vol. 11; IEEE Computer Society, Washington, DC, 2003; pp. 814-819.
Chivers, Howard and Martin, Andrew; Workshop on Grid Security Practice and Experience; Jul. 2004; Oxford; pp. 11-15 to 11-25.
International Search Report for PCT/GB2008/001077, mailed Sep. 24, 2008.
Basic TrustCom reference implementation, Deliverable 19, Sep. 2005, Version 1.0, 186 pgs.
International Search Report for PCT/GB2007/000590 mailed Apr. 26, 2007.
Dimitrakos, T., Enabling Dynamic Security Perimeters for Virtual Collaborations, Central Laboratory of the Research Councils, Rutherford Appleton Liib., UK; CRMPA, Universita di Salerno, Italy, IOS Press, 2004 (8 pgs.).
Ian Foster, Carl Kesselman, Jeffrey M. Nick, Steven Tuecke. The Physiology of the Grid : An Open Grid Services Architecture for Distributed Systems Integration Globus Alliance Technical Report 2002 (31 pgs.).
Ian Foster, C. Kesselman, J. Nick, S. Tuecke, "Grid Services for distributed systems", *IEEE Computer* 2002, (10 pgs.).
Burton Group, "Turning the Network into the Computer: The Emerging Network Application Platform", *Application Platform Strategies* Report, 2005, (50 pgs.).
J. Kephart and D. Chess, "The Vision of Autonomic Computing", *Computer Magazine*, IEEE, 2003, (10 pgs.).
T. Dimitrakos, D. Golby, P. Kearney. "Towards a Trust and Contract Management Framework for Dynamic Virtual Organisations", In *eAdoption and the Knowledge Economy: Issues, Applications, Case Studies*, 2004 IOS Press Amsterdam, ISBN: 1-58603-470-7, (9 pgs.).
Theo Dimitrakos, Giuseppe Laria, et al. "Towards a Grid Platform Enabling Dynamic Virtual Ogranisations for Business Applications", In Proc. of *3rd Int. Conf. on Trust Management, iTrust:2005*.LNCS Springer, 2005, (5 pgs.).
Sonic Softwarem, Systinet. Amber Point, Bearing Point. "A new Service-Oriented Architecture (SOA) Maturity Model". White paper release Oct. 27, 2005, (28 pgs.).
Foster. A Globus Primer, Or, Everything You Wanted to Know about Globus, but Were Afraid to Ask, Describing Globus Toolkit Version 4, May 8, 2005 (69 pgs.).
DataPower SML Web Services Access Control and Federated Identity Management, 2005 RSA Security Inc., (2 pgs.).
RSA Secured Implementation Guide for XML Gateway/Firewall Products, Last Modified Jun. 9, 2005 (6 pgs.).
Layer 7 Technologies, XML Appliances for SOA and Web 2.0, Secure, Simplify and Scale Your Web Services, 2006 (2 pgs.).
Forum Systems XWall Web Services Firewall, A solid security solution, by Brian Barbash, Oct. 2004 (2 pgs.).
Keith Ballinger et al., Web Services Metadata Exchange (WS-MetadataExchange), Sep. 2004 (23 pgs.).
Siddharth Bajaj et al., Web Services Policy Attachment (WS-PolicyAttachment), Mar. 2006 (29 pgs.).
Dimitrakos, T. et al, 2004. TrustCoM—A Trust and Contract Management Framework enabling Secure Collaborations in Dynamic Virtual Organisations. *ERCIM News* No. 59, pp. 59-60 (2 pgs.).
C. Steel, R. Nagappan and R. Lai, *Core Security Patterns*, Prentice Hall and Sun Microsystems, Dec. 2005 (Figure 8-4 only) (1 pg.).
Office Action (20 pgs.) dated Jul. 25, 2013 issued in co-pending U.S. Appl. No. 12/594,059.
Notice of Allowance ( 14 pgs.) dated Jul. 31, 2013 issued in co-pending U.S. Appl. No. 12/594,045.

\* cited by examiner

MESSAGE PROCESSING METHODS AND SYSTEMS

This application is the U.S. national phase of International Application No. PCT/GB2006/004088 filed 1 Nov. 2006 which designated the U.S. and claims priority to GB 0625113l.6 filed 2 Mar. 2006 and GB 06254585.0 filed 4 Sep. 2006, the entire contents of each of which are hereby incorporated by reference.

FIELD OF THE INVENTION

The present invention relates to systems for and methods of controlling the operation of a distributed application running on a distributed computer. It has particular utility in relation to the distributed applications built upon a service-oriented architecture.

BACKGROUND OF THE INVENTION

Distributed applications are now well-known. Examples include the distributed application formed by a combination of a web-browser and web-server. Another example is the global e-mail system supported on top of the Internet.

User configuration of such distributed applications is also well-known. For example, the user of a web-browser is able to control whether a web-site is able to store cookies on his computer. Similarly, the user of an e-mail client program is able to set rules which dictate how his computer handles incoming mail.

However, it is often the case that an administrator of a distributed computer or computer network wants to control the operation of such a distributed application without requiring action on behalf of a user. For example, an administrator of a corporate network might wish to prevent employees from accessing web-sites featuring adult content or offering gambling services. Similarly, an administrator might wish to prevent e-mail users from receiving spam e-mails.

An administrator can achieve such ends by appropriately configuring a computer which intercepts requests for web-pages from employee's browsers or intercepts e-mails destined for an employee. Such computers are sometimes known as application-level firewalls.

Security in a distributed computer running a distributed application may be applied on a per-message basis (distributed applications normally work by passing messages between computers running components of the distributed application). This is known as message-level enforcement. Message-level enforcement is typically implemented using so-called 'interceptors'. The term interceptors is used herein in the broadest sense, to describe functionality that can be used to process a message.

For large networks, it is known to allow the administrator to configure a network using so-called 'policies'. These are often a set of condition-action rules which network elements can interpret. By copying the sets of rules to many network elements the task of configuring the network is made easier for the network administrator. An object-oriented information model for this type of policy is seen in the IETF's RFC 3060. US Patent Application 2004/0193912 discloses the use of policies to control a computer network.

The idea of building distributed applications from components created by different parties has recently received much attention, Although the concept of remote procedure calls and remote method invocations has been known for decades, only more recently has the problem of interfacing components written by different people in different programming languages been tackled. One important enabling technology for distributed applications of this type are implementations of the CORBA specification produced by the Object Management Group. CORBA stands for Common Object Request Broker Architecture, and involves the use of an Object Request Broker in passing method invocations from a subject to a target. A more recent example is the 'Web Services' specification. Software which enables the inter-operation of components running on different platforms is known as 'middleware'.

The CORBA standard applies a narrower meaning to the word 'interceptor' that the definition given above. In particular, in chapter 21 of the standard, it says 'Portable Interceptors are hooks into the ORB through which ORB services can intercept the normal flow of execution of the ORB.'

Systems and methods of building sequences of interceptors (in accordance with the narrower definition given above) are discussed in international patent application WO 00/45256, published on 3 Aug. 2000. This application describes methods of dynamically building an interceptor chain specifically under a CORBA 3.0 middleware engine-based environment, using the so-called Adaptive Runtime Technology™ (ART) framework, which is a microkernel architecture that supports dynamic configurations of the architecture. This patent application is particularly concerned with how to invoke and then process interceptors. As described, the interceptor arrangement preferably has the property of being recursive, whereby the ORB passes control to a first interceptor in the chain, which passes control to the next interceptor in the chain, and so on, until the last interceptor has completed its processing. The last interceptor then passes control back to its caller, and so forth, until control is returned to the ORB. Additionally, each interceptor preferably applies intrinsic chaining, whereby each interceptor contains information enabling it to identify and pass control to the next interceptor automatically and without reference back to the ORB, where references back to the ORB are said to incur significant time and processing overheads. According to the description in WO 00/45256, the order in which interceptors are placed into a chain is provided by a configuration file, particular to each domain.

SUMMARY OF THE INVENTION

According to a first aspect of the present invention, there is provided a method of controlling a distributed application executable on a distributed computer, said method comprising operating said distributed computer to:

intercept a message passing between computers within said distributed computer performing said distributed application;

read said message and in dependence upon the contents of said message identify a corresponding run-time-updatable message-handling policy, indicating, for predetermined characteristics of the content of a message, lists of actions to be performed on said message;

read deployment-time settable action-to-software-module mapping data which indicates for each of the actions in said list a software module to carry out the action; and perform said list of actions by triggering the execution of the corresponding software modules found in said mapping data.

According to a second aspect of the present invention, there is provided a distributed computer for performing one or more distributed applications, said distributed computer comprising:

a plurality of computers connected to one another via communication links;
said distributed computer storing:
i) a run-time updatable message handling policy indicating, for predetermined characteristics of the content of a message, lists of actions to be performed on said message being passed between said computers in performance of said distributed application;
ii) a deployment-time settable action assignment policy indicating one or more descriptions of software routines for performing actions in said lists of actions;
iii) message handling software executable, on receipt of said message, to select one of said lists of actions in dependence on the contents of said message and said message handling policy, and to trigger the execution of said software modules in accordance with said action assignment policy.

By updating said message handling policy at run-time a user or administrator can affect the operation of said message handling software, without needing to update the more complex references to software routines that actually carry out the actions selectable when updating the message handling policy. Thus, the message handling software need not be re-deployed in order to adapt it to a change in, for example, perceived threats to a distributed application which operates by passing messages between computers. Consequently, the distributed application can also continue to run whilst the adaptation takes place.

BRIEF DESCRIPTION OF THE DRAWINGS

By way of example only, specific embodiments of the invention will now be described with reference to the accompanying drawings in which.

DETAILED DESCRIPTION OF SPECIFIC EMBODIMENT OF THE INVENTION

Figure 1:
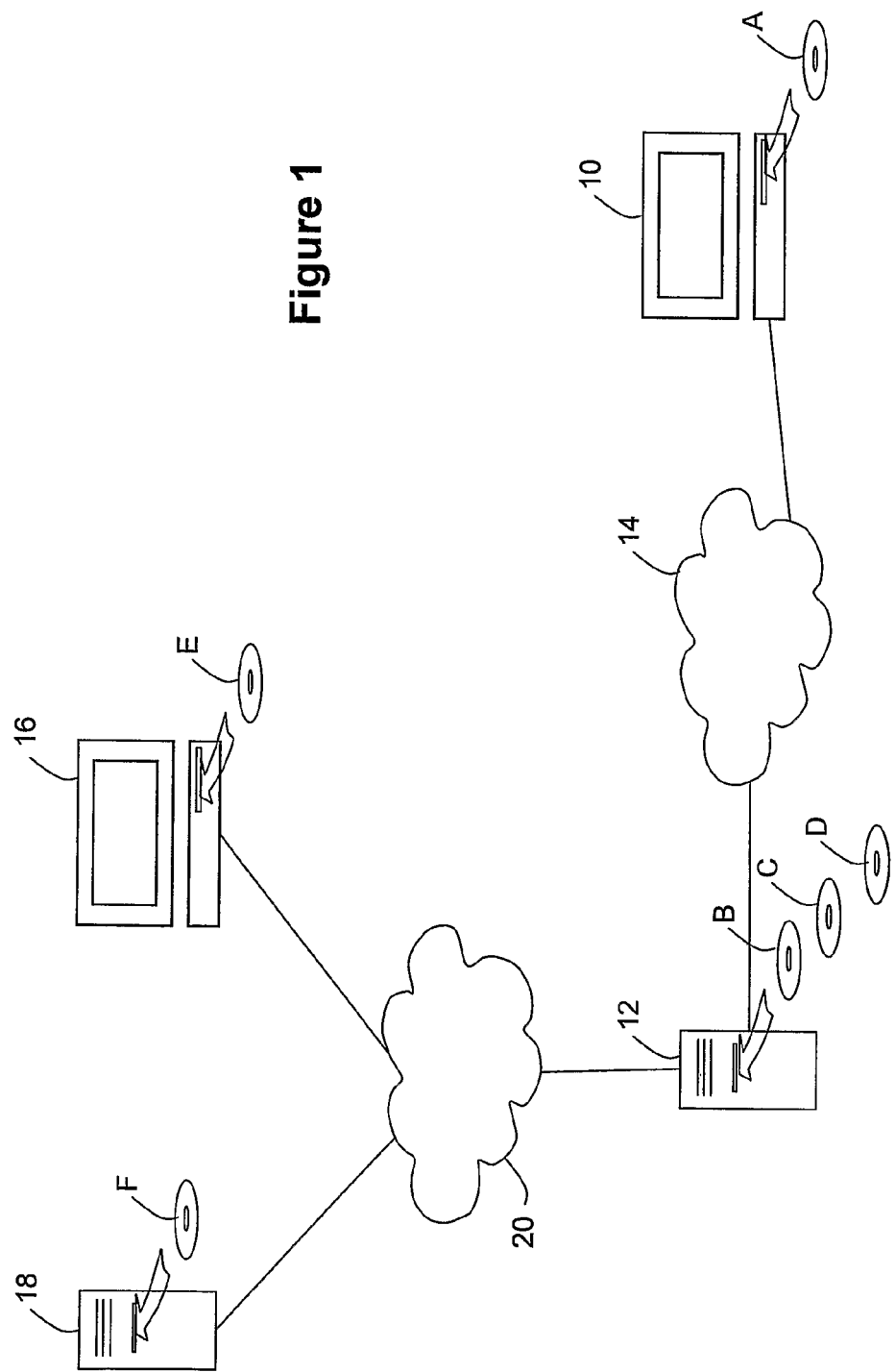
FIG. 1 shows a computer network according to a first embodiment of the present invention which is arranged in operation to provide a secure, dynamically configurable on-line flight-booking application.

FIG. 1 shows an example of a computer network in which a first embodiment of the present invention is implemented. The computer network includes a customer's PC 10 which can be connected to a flight-booking agency's server computer 12 via the Internet 14. The flight-booking agency's server is in turn connected to an administration computer 16 and a utility services server computer 18 by a private network 20.

The flight-booking agency's server computer 12 is provided with web server software which enables a customer to book flights online. Such software is installed from CD-ROM B. The customer's PC 10 is provided with browser software which enables the customer to interact with the web-server 12. A browser might be installed from CD-ROM A. Such distributed application software is well known and will not be described further.

In addition to the above conventional software, 'enforcement middleware' is installed on the server computer 12 from CD-ROM C. This enforcement middleware includes a core enforcement component and a transport component which can intercept XML messages arriving at the server computer 12 and pass them to the core enforcement component (it will be understood by those skilled in the art that handlers which convert HTTP requests and response to XML are well-known, and need not be described in detail here). The core enforcement component includes an XML processor able to process an XML stream (in this embodiment the XML processor is provided by the SAX software package). The transport component 'plugs-in' to the SAX software package as will be understood by those skilled in the art.

The core enforcement component includes dynamic handler chain management software as will be described in detail below. It also provides the interface which allows an administrator to use the administration computer 16 to load, update etc. policies stored on the web-server computer 12.

In addition, one or more local interceptor executables are loaded onto the web-server 12 from the CD-ROM D. In this embodiment, interceptors are software modules which are triggered in accordance with the dynamic handler chain created by the core enforcement program.

The administration computer 16 has a Web-Service Distributed Management implementation such as Apache MUSE or any other implementation that supports WSDM protocol stack (e.g. IBM Websphere, CA WSDM) or the WS-Management stack (e.g. Microsoft NET WSE) installed upon it from CD-ROM E (it will be realised that WS is a common abbreviation for Web Services). This enables an administrator to load configuration files and policies into the web-server computer 12 in order to control its operation as will be described below (policies are normally more dynamic that configuration files—i.e. more frequently updated—especially they are often updated during the execution of the application they control).

As will be described in detail below such administration software provides a notification broker which handles notifications generated by the core enforcement component as will be described below, a graphical user interface allowing the administrator to work on policy lifecycle management, and allows the aggregation of management interfaces of multiple enforcement systems.

A protected resource address list comprising the "internal" addresses of protected resources is also installed on the web-server computer 12. This enables a logical address relating to a group of policies to be converted to a real address by the web-server computer 12.

The utility service server computer 18 is provided with software providing one or more utility services (e.g. certificate verification, security token validation) from CD-ROM F.

Figure 2:
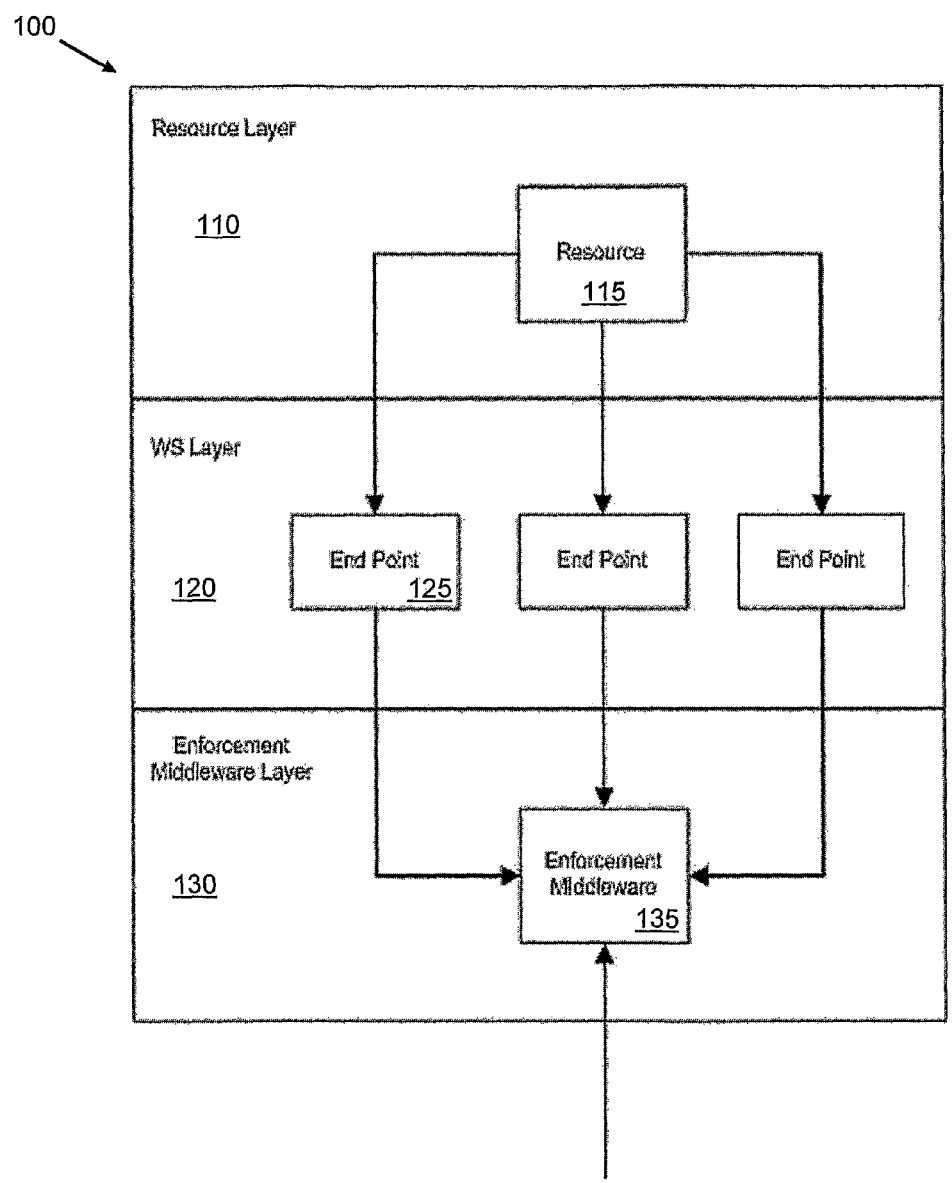
FIG. 2 is a block diagram presenting a high-level view of the basic framework of the first embodiment.

The block diagram in FIG. 2 illustrates, at a more conceptual level, how embodiments of the present invention operate. The diagram illustrates three regions or layers: a resource layer 110 containing one or more protected resource processes 115, a Web services layer 120 containing one or more endpoint processes 125 and an enforcement middleware layer 130 containing an enforcement middleware process 135.

Thus, a protected resource 115 can be thought of as the target process to which a message or request is directed, an end point process 125 can be thought of as providing an interface for accessing a resource and an enforcement middleware process 135 can be thought of as a pre or post processor for messages or requests that are directed to or from the resource 115.

To expand upon FIG. 2, "enforcement middleware" 135 is a processing entity that is placed between a computational resource (e.g. the core enforcement program of FIG. 1) and the rest of the network. Enforcement middleware can be realised as software, for example in a programmable computing context (as seen in FIG. 1). Alternatively, enforcement middleware can, at least in part, be realised in firmware, for example in the context of an embedded processing system. Firmware-based systems include firmware of a network node, for example, such as a message router, a message hub or a firewall.

As will be understood by those skilled in the art, an "endpoint" is a (referential) entity, processor, or resource where messages for a network service can be targeted. An endpoint indicates a specific network location for accessing a network service using a specific protocol and data format. From an architectural perspective, it is understood as an association between a protocol binding and a network address that may be used to communicate with this service.

A protected resource (or "protected service") is a network service or a resource that is exposed as a network service (or resource), of which associated endpoints are protected by one or more enforcement points that intercept all of the incoming and outgoing messages respectively to and from the service (or resource) at each network endpoint.

Figure 3:
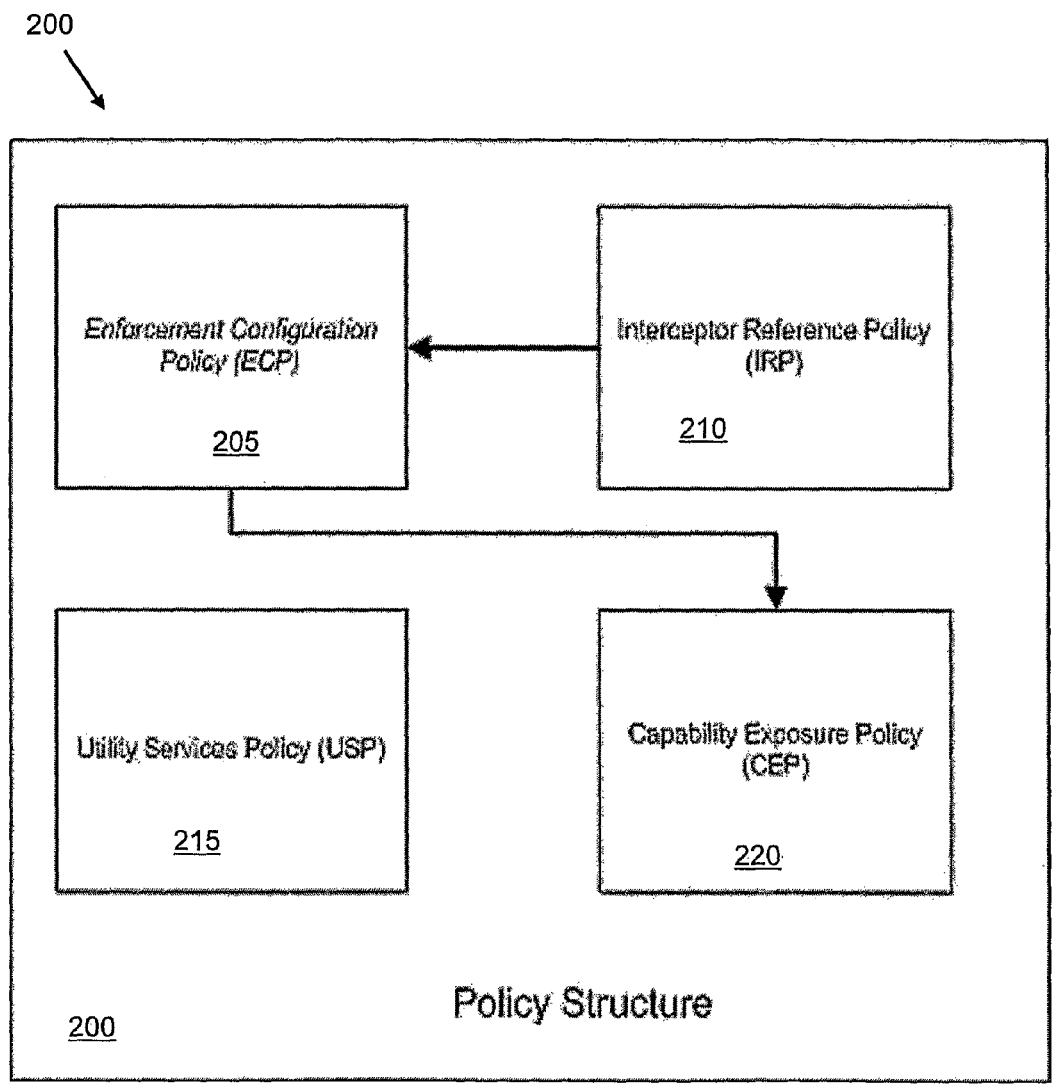
FIG. 3 is a block diagram showing the structure of a typical security policy in accordance with the first embodiment.

Returning to the embodiment of FIG. 1, the behaviour of the core enforcement program is dictated by a number of policies stored at the web-server computer 12, which are illustrated schematically in the block diagram in FIG. 3. Other formats and arrangements of policy are, of course, possible. In this specific embodiment each of the policy types is an XML document formatted in accordance with a common XML schema. This ensures that action tags in the ECP do have the same meaning as action tags in the IRP, and enables the interworking of policies and program components provided by different vendors. The four policy types illustrated in FIG. 3 constitute an enforcement middleware policy framework 200, comprising:

An Enforcement Configuration Policy (ECP) 205: This policy type describes actions that can be enacted in response to the receipt of a message by the transport component, the conditions under which each action can be executed, the parameters for each action and the sequencing of the actions. The action types in the ECP are a subset of the action types included in an Interceptor Reference Policy, discussed below. In relation to security, the ECP specifies what sequential security actions are required to effectively fulfill the security requirements of the system in order to process a message.

The ECP can contain information concerning:
Reference to a message object representation, i.e. a datatype representing the message intercepted. This is the default input and output for each interceptor invocation.
Enforcement state type. This local state information is passed from interceptor to interceptor in order to implement dependences internal to the particular enforcement configuration specified by the ECP (examples of attributes that persist across ECP statements are "message type", "element type", "token", "authorization status", "requires response", etc.)
Enforcement actions supported ("VS-security schema validation/compliance", "Signature validation", "token validation", "response log", "failure notification", etc.);
Conditions for enforcement action selection (Each enforcement action has some explicit or implicit precondition covering (a) when it should be enacted and (b) information that it assumes present in terms of message content and enforcement state. For example signature validation may assume compliance to WS-Security schema and information about the signature validation algorithm and secret key to be used. These are part of the enforcement state and are either stored in memory or retrieved from the message during prior processing steps to the evaluation of the specific action. An enforcement action may also have some associated post-condition. For example token validation requirements mentioned in the specific example below which includes a specific constraint about all claims in the token and requestor's identity sensitive tokens.)
enforcement state variables, that is a collection of shared variables, which are introduced by the IRP and any subset of which can used in the ECP (examples of enforcement state variables are "tokens", "signature algorithm", "secret key", "authorisation status", etc.)
state variables necessary for the invocation of the interceptor and state variables that may be updated as a result of the invocation (state variables are attributes of the form "authorisation status", "requires response", etc.)
Order in which the enforcement actions are performed (a (total or partial) order between actions may be defined. Order meets two types of constraints: logical dependencies between enforcement actions described in the ECP. For example "validate all tokens before you proceed" or operational dependences that are inferred from statements about dependencies between the different enforcement actions described in the IRP. For example "signature validation" requires "key management protocol" and "key provisioning", etc.)
USP references to any auxiliary infrastructure services to be invoked in the scope of each enforcement action.

Local state variables of the ECP capture enforcement state, are constrained within the scope of the ECP execution and they may persist between different execution instances of the ECP. One example of such an enforcement state variable is that a "certificate validation" action may update a "cryptographic key" value that is in turn used by a "decryption" action and nullified at the end of the ECP execution. Another example is that a "register transaction context" action may append a transaction identifier to a transaction context variable that persists after the end of processing the intercepted message.

An illustrative example of an ECP is given below:
ECP Instance 1
  Incoming message flow:
  Successful completion of the enforcement requires the message is a SOAP message (recognised by reference to the XML schema of the expected version of SOAP)
    the following conditions/actions
      "WS-Security standard is required" (will in practice include: reference to XML schema of WS-Security; a number of [WS-Security] tokens that may be present in the message, and can optionally specify tokens of types X, Y or Z;)
      "If the message is signed then the signature is validated" (might include an indication of a part of the message that is optionally signed, referencing the XML schema of the XMLSig version required)
      "All tokens are successfully validated"
      "The requestor's claims are verified and its attributes are decided" (will in practice include a constraint on the type of token validation. Validation of all claims enclosed inside a validated token. Will also specify return list of validated claims. The validation may require the requestor's identity to be in the token or the message context);
      "Every action of the requester is authorised" (If this involves calling an external utility service (e.g. access control policy decision point) an identifier needs to be provided and this identifier needs to have associated a USP clause);
      "If a requested action requires response then the starting time of processing this request is logged and the service level guarantee monitor is notified" (response time needs to be logged for all request-response actions that need to be logged, and provide identifier of the log service. If this is an external utility service then a USP clause needs to be associated with it. (Identifying which action is request/response may require parsing the WSDL of the protected service)).
      "in the case of a failure of an action communication is terminated and failure-log services at requester's and the provider's side are notified of the failure type" (in practice will state which failure report mechanism is used, declare the failure event and for each failure event which type of failure action has to be performed).
  Outgoing message flow
  ...

Interceptor Reference Policy (IRP) 210: The IRP specifies the location of corresponding interceptors. The location can, for example, be a particular path within the enforcement software package pointing to the corresponding binary or it can be an endpoint reference to a remote resource. More specifically, this policy type contains mappings between each available enforcement action, which is specified by the ECP, and a software entity (that is, the interceptor) that executes the action. The types of enforcement actions contained in this policy are a superset of the enforcement actions contained in ECP.

If an interceptor executing an enforcement action requires an external infrastructure service to be invoked (for example one stored on the utility server computer 18, the policy contains a unique static reference for the invocation and an appropriate Message Exchange Pattern of the external invocation. A Utility Service Policy (described below) is used to resolve these static references to a respective endpoint reference of the available infrastructure service at execution time of the interceptor.

An IRP can be updated by an authorised entity, for example an administrator or a management service. According to the present embodiment, this type of policy can only be changed in conjunction with a pool of interceptors being redeployed. A tight coupling between this policy and the pool of interceptors is necessary in order to preserve system dependencies (it will be remembered that local interceptor instances might be loaded onto the web server computer from CD-ROM D.

An example of an Interceptor Reference Policy is given below.
IRP Instance 1
  The following interceptor configurations apply;
  Default Encryption:
    Interceptor Type: Implements XML encryption version xyz
    Interceptor location: . . .
    Requirements
      Cryptographic Key algorithm: . . .
      Keystore: . . .
      a Private key reference: . . .
      Handler location
      Encrypted data reference: XML element reference (in intercepted message)
    Dependencies
      Key management protocol:
      Keystore type: . . .
      Interceptor 1
      Interceptor 2
  Default Signature Validation
    Interceptor Type: Implements XML signature version xyz
    Interceptor location: . . .
    Cryptographic Key algorithm . . .
    Requirements
      . . .
    Dependencies
      . . .

Utility Service Policy (USP) 215: As mentioned above, while processing a message, some interceptors may require the capabilities of some external services. For example, in order for an enforcement point to verify a certificate or a token that is found in a message an interceptor may have to query or invoke an appropriate security token service, if the required functionality is not available locally. Likewise, in order to obtain an access control decision, an interceptor may need to invoke an access control policy decision point. All of the information regarding the alternative services available and the locations of these services are contained in the USP.

The USP contains information that enables the invocation of additional infrastructure services. This policy defines a mapping that resolves the static USP references contained in the ECP to a single, or a prioritised, list of endpoint references of infrastructure services that implement the same Message Exchange Pattern. This separation between ECP and USP allows administrators and management services to update the binding between the enforcement point and any external infrastructure services dynamically without the need to redeploy or update the interceptors in place.

The type of service and interactions required to process a message are typically embedded into the code of a particular interceptor. However, there could be many services of the same type and some of them might not be available for some reason, for example the address of a particular service might have changed. In order to improve reliability, therefore, the interceptors preferably make remote invocations by using static references that are resolved at run-time (that is, at the time of creating the interceptor chain) by consulting the USP. An authorized entity, for example an administrator or management service, can reconfigure details such as the addresses and endpoint references of the additional external auxiliary services involved in the enforcement process. This type of information is contained within the USP, and which is configurable via the dedicated manageability interface at the administrator's computer.

The additional configuration information in the USP mentioned above includes the address, priority and terms and protocol of invocation of external infrastructure services. Such items of configuration information are called USP references, which are stored in the USP and accessed each time a handier is deployed in a handier chain (as will be described below) in order to process an intercepted message.

Furthermore it may be preferable that within the same security administrative domain different instances of the enforcement middleware (the core enforcement program is an example of enforcement middleware) are distributed over the network and share a common security token service or the same PDP. The ability to refer explicitly to such utility services via the USP, and configure the binding of the instances of the enforcement middleware with these utility services, improves flexibility and facilitates the aggregation of enforcement functions by introducing a dependency between a collection of distributed enforcers with the same authority.

An authorized entity, for example an administrator or management service, can introduce or update this information independently of the ECP and IRP via a dedicated manageability interface. Each USP reference may include a list of addresses (for example, in the form of network service endpoint references) of infrastructure services. Each entry in the list may be accompanied by a protocol identifier and any additional configuration parameters that assist the interceptor implementing the expected MEP for invoking the corresponding external infrastructure service. The order in the abovementioned list reflects the order of priority by which external infrastructure services can be invoked by an interceptor. If an external service is unavailable or there is a fault the interceptor may invoke the next service in order.

An example of a USP is given below:
USP Instance 1
The following infrastructure services are used to support the executing enforcement actions:
   Security Token Services:
      For validating X509 tokens use STS at http://my.trusted.X509-sts/service-valiate
      Alternatively STS at http://my.trusted.X509-sts/alternative
   For validating SAML tokens use the STS
      at http://my.trusted.BT-SAML-sts/main if the token is issued by BT
      at http://my.trusted.SAML-sts/main otherwise
      For obtaining X509 tokens, the STS at http://my.trusted.X509-sts/service-issue
      For obtaining SAML tokens, the STS at http://my.trusted.SAML-sts/service-issue
   Attribute Authority (AA): Use AA at address http://my.trusted.attribute-authority/service
   Access Control: Access control decisions are made by policy decision point (PDP)
      at http://my.trusted.PDP/service-critical if the requested action semantics are of type CRITICAL; all interactions with this PDP are signed and encrypted; use SAML/XACML profile
      at http://my.trusted.PDP/service otherwise; XACML request-response is used
   SLG Monitor: Use monitor at address http://my.trusted.monitor/notification-broker
   Fault recipient:
      requester: as defined in the WS-Addressing header of the incoming message
      service: use http://my.trusted.monitor/fault-log Capability Exposure Policy (CEP) 220: This policy is used for publishing additional conditions for interacting with a protected resource. This policy is derived by the ECP by collecting types of message elements (message content) and MEP-specific contextual information that is used as parameters or arguments in the execution of an enforcement action specified in the ECP.

It is often the case that a network service should advertise the conditions under which it can be invoked. The CEP is created in order to make the knowledge public about these conditions. The CEP is derived from the ECP.

The CEP, in effect, hides the logic behind choosing and sequencing enforcement actions defined by the ECP, and contains only the type of information that is required in a message or a MEP as external input from a client of the protected service. The CEP is publicly visible to other services enabling them to create requests in compliance with any security and other quality of service requirements of a protected service.

The entities interacting with a protected resource are obliged to provide the required data in addition to any other application-specific data requested by the provider of the application service. As such, the conditions in the CEP augment an overall contract under which a protected resource is used. The information is provided by clients or other services who wish to communicate with the protected resource so that they construct messages in accordance with the recipient's requirements without complicated negotiation mechanisms.

According to embodiments of the present invention, ECPs are deliberately separated from IRPs in order to abstract away implementation specific detail. For example, an EFP policy can state that decryption of the SOAP message body is executed but there are different algorithms that can be applied to do so. In order to dynamically deploy the appropriate interceptor in the chain, which will correctly execute enforcement actions, the content of a message has to be analysed and the actual encryption scheme will need to be identified from the intercepted message. The ECP is used to identify the relevant enforcement actions, their respective configuration parameters and the order in which they will form the chain, the IRP is then uploaded and inspected in order to determine the references to the interceptor implementing each enforcement action. The IRP maps an enforcement action to an interceptor implementing the action. This can be a local interceptor that is deployed as part of the same software package or a remote an interceptor at a remote host.

The adaptive nature and the dynamicity of the core enforcement program according to the first embodiment of the present invention are in part facilitated via configurable interceptor chains, as will now be described with reference to FIG. 4.

Typically, according to embodiments of the present invention, the selected composition of interceptor chains 510, formed by the enforcement middleware 135 on a per-received-message basis, is based on an analysis of the content of a respective message and the security requirements of the protected resource 115. Interceptors 500 are selected and inserted into the chain 510 on the basis at least these two factors.

Figure 4:
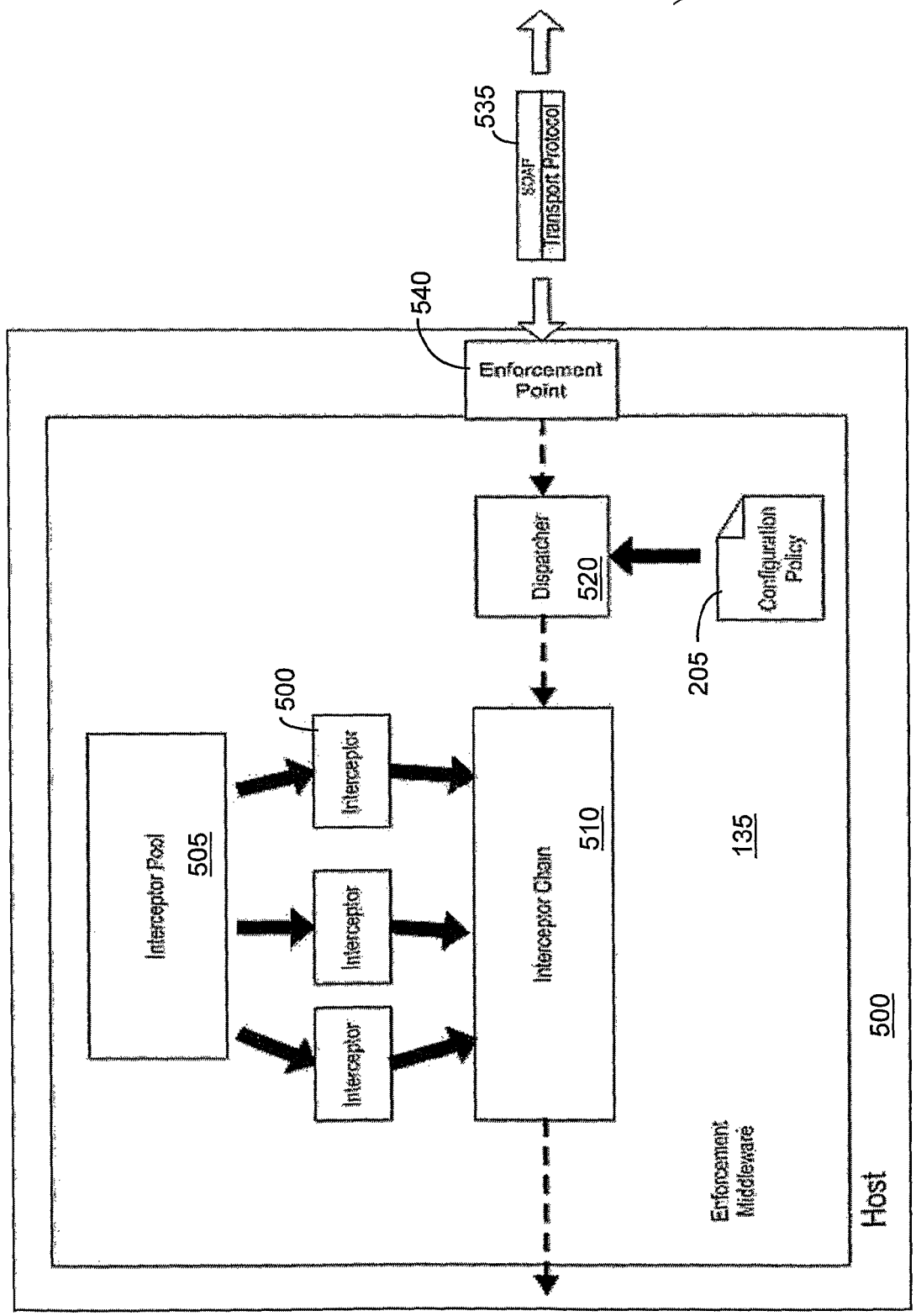
FIG. 4 is a block diagram of the system architecture of the first embodiment with enforcement middleware deployed locally with respect to the flight-booking agency's server.

Considering in more detail the diagram in FIG. 4, which relates to locally-deployed interceptors, all interceptors 500 are made available in an interceptor pool 505. The core enforcement program includes a dispatcher process 520 which is a component that is able to identify a policy 205 to be enforced for an intercepted message 535 based the content of the message. On the basis of the policy 205, the dispatcher 520 determines which interceptors 500 from the pool 505 to invoke and which order to invoke them in.

The dispatcher process is configured by way of a configuration file—one example of which is given below:
Dispatcher configuration
Upon message interception check
Message envelope
Message header blocks
If WS-Addressing header is present then
If wsa-to element is http://www.somesitecom/resource and
the <resource-id> element is "ABC" and
the <federation-id> value is "XYZ"
the <transaction-id> is "123"
then select
ECP instance 1
IRP instance 1
UDP instance 1

Figure 5:
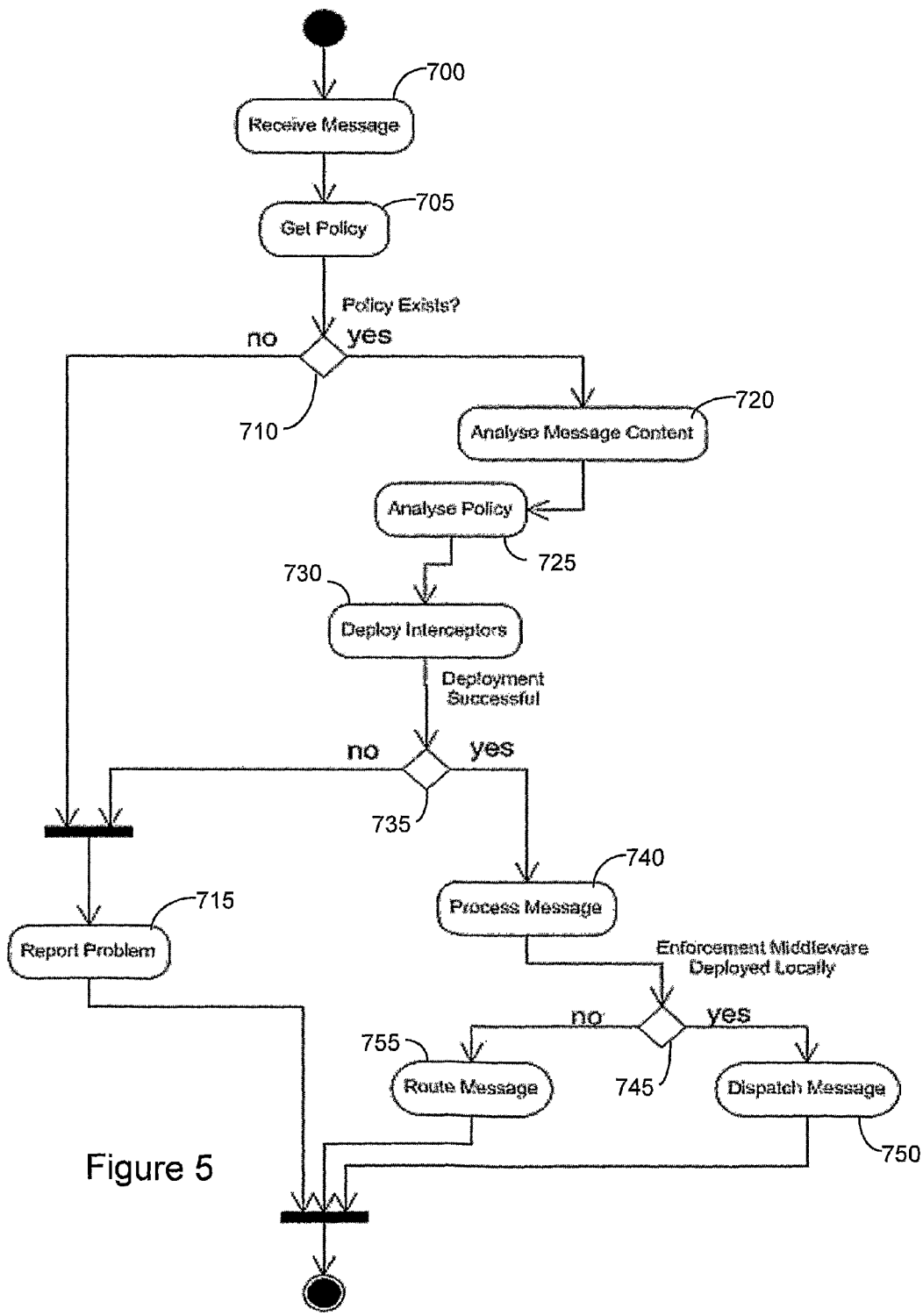
FIG. 5 is a flow chart illustrating the processing of a message within the computer network of FIG. 1 according to the first embodiment.

The operation of the core enforcement program is illustrated in the flow diagram in FIG. 5. A message is received, or intercepted, in a first step 700. In step 705, the dispatcher identifies whether there is a policy suitable for processing the message, by inspecting the contextual information (that is the message header for SOAP messages). For the present purposes the inspection includes:
- an inspection of the addressing information of the intercepted message;
- an identification of the URI of the message recipient, in order to determine which protected resource is involved; and
- maintenance of, a mapping (for example, a hash-table) of ultimate recipient URIs to "enforcement configuration policy" identifiers.

In the context of the present embodiments, this inspection is necessary as the message content might convey information to determine which ECP to use. In other words, different ECPs can even be selected on the basis of message content. For SOAP messages, for example, it is generally recommended herein that the ECP is determined by inspecting the reference to the service endpoint that the message is targeting and, optionally, any other contextual information that is included in the message header in relation to this endpoint reference.

Based on this contextual information and the state of the enforcement middleware, the enforcement middleware determines whether an ECP policy is available for processing the message. If, in step 710, it is established that a suitable policy is not available for any reason, a problem is reported, for example via an administrative interface in step 715, and the process ends. If an ECP policy is determined, then, in a next step 720, the dispatcher analyses the contents of the message, The message evaluated with reference to the ECP, in step 725.

Next, in step 730, an interceptor chain is generated by deploying the available interceptors. Based on the ECP policy and the IRP policy a chain of interceptors is formed in order to process the intercepted message and enact the specified enforcement actions. The interceptors are selected from the associated interceptor pool using the references described in the IRP and are invoked with the conditions and parameters described in the ECP.

Notably, the reference to the interceptor implementing each enforcement action is explicitly defined in the IRP and it is not mentioned at the ECP. This abstraction decouples implementation specific references from the ECP. Also it is possible for the interceptors to have their own implementation specific configuration polices which are not represented in ECP, though a description herein of such policies is not necessary in order to understand aspects and embodiments of the present invention.

In principle, herein the core enforcement program treats the interceptors of the chain as black boxes. The setting-up of the chain passes individual configuration information to the interceptors before the chain processes a message. If the interceptor chain is not created successfully, ascertained in step 735, then a problem is reported via an administrative interface in step 715.

If the creation of the interceptor chain is successful, however, then the message is processed by the interceptor chain in step 740. Each interceptor then uses the configuration information (if provided and, indeed, if necessary) to execute in order to process the message and to report any errors occurring.

After the processing of the message the message is either dispatched in step 750 or routed in step 755 to the recipient. If the message processing is being done remotely, according to step 745, then the processed message is routed to its destination. Otherwise, if the message processing is being done locally (as is the case in the first embodiment illustrated in FIG. 1), the processed message is dispatched to the protected resource, or to some other kind of network node at which the message was directed. Dispatching implies that the message does not have to travel over the network in order to reach its final recipient (as would be the case in the embodiment shown in FIG. 1). Routing however assumes that the enforcement point is one of the intermediary SOAP nodes on the path of the message. In either case, the process then ends.

As already mentioned, the execution of an enforcement action may require functionality offered by external auxiliary infrastructure services. This includes, for example, an enforcement point invoking a STS (as already mentioned) in order to validate a security token that has been encountered in an intercepted message, or the enforcement point invoking an access control PDP in order to obtain an access control decision. In such cases the interceptor will have to invoke such external services. However, there could be many such services of the same type, some of which may not be available at a particular instance, and the address of a particular service can change. Furthermore the location and conditions of invocation of such services may change over time. In order to accommodate such changes the interceptors access at run time the additional configuration information in the USP mentioned above.

Once the message is processed the interceptor chain is dissolved in anticipation of another message being intercepted. If required by the MEP being implemented by the service local memory of the enforcement actions may be kept so that it is taken into account during the processing of a correlated message.

This is achieved by utilising local state variables of the ECP. In a subsequent evaluation of the same ECP for a different message with the same transaction context identifier an "inspect transaction context" action will recognise the existence of this transaction as an already known transaction.

Notably, the treatment of interceptors in embodiments of the invention is such that enforcement actions and the interceptor invocations implementing them are:

Atomic—meaning that ECP and IRP cannot refer to the internal structure of an enforcement action or the associated interceptor, other than pass specific configuration information and catch any updates to the enforcement state that may result from the invocation of the interceptor ECP execution transient—meaning that there is no implicit dependency between invocations of the same interceptor between different evaluations of the an ECP; the invocation of each interceptor can be understood as a computation that initiates, executes and terminates within the scope of applying one ECP instance.

Stateful—meaning that they are passed (the relevant part of) the ECP enforcement state which may change within the scope of applying one ECP instance or between different applications of the same ECP over different intercepted messages; wherein enforcement state information is passed to the interceptor at each invocation thereof.

The behaviour of the enforcement middleware in terms of sequence and type of the enforcement actions and types and locations of third party services invoked during the process of enforcement is determined by the private policies, that is the ECP and the USP. Private policies can be configured by an authorised entity via corresponding dedicated configuration interfaces; In the case of manageable services, it is preferred that the latter extend the manageability interfaces exposed by the service.

According to embodiments of the present invention, the enforcement middleware defines different groups of interceptors based on the type of the enforcement action they implement. The groups comprise:

1. Verification Interceptors: which validate certain aspects of either the communication context or the message itself. Such interceptors include XML schema validation and signature verification.
2. Transformation Interceptors: which transform the representation of the message. Such interceptors include components providing encryption/decryption, or components removing inappropriate or sensitive data.
3. Infrastructure Capability Interceptors: which implement enforcement actions dependant on the common infrastructure capabilities used for the enforcement.

In relation to these kinds of interceptors, it is to be noted that:

Encryption/Decryption and Signature validation may require accessing a key-store that is external to the interceptor.

Security token insertion may require invoking an external security token service that issues a token Security token validation may require invoking an external STS that validates the token Access control enforcement may require invoking an Authorisation Service (or Access Control PDP) that performs the access control decision, based on information provided by the interceptor.

In relation to interceptor deployment and message processing, fault notification usually takes the form of a message containing information about an abnormal event or error that occurs within the system. In addition, a similar procedure occurs for other faults that arise in the enforcement middleware.

Figure 6:
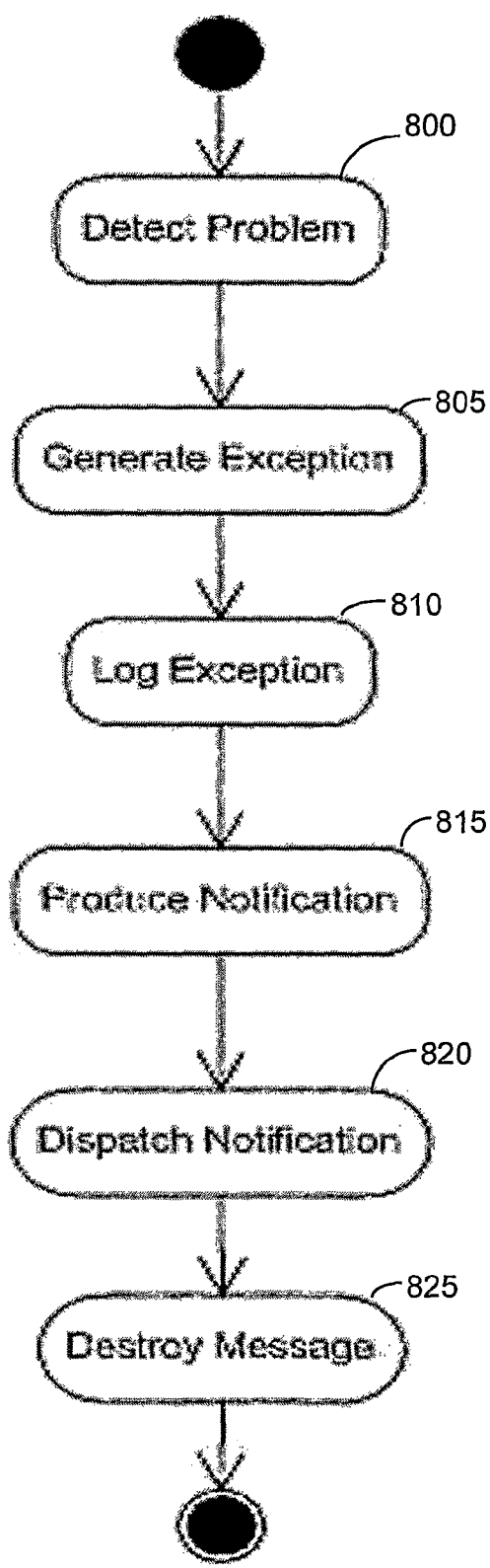
FIG. 6 is a flow chart showing the sequence of actions the system will take in case of a problem being detected.

For example, any fault that occurs during the execution of an interceptor is logged and reported. The flow diagram in FIG. 6 describes a generic fault reporting mechanism. In a first step 800, a fault is detected. Fault detection automatically generates an exception, in step 805, which is logged in an exception database in step 810. Then, in step 815, an exception handler of the enforcement middleware generates a notification message, which is dispatched to the appropriate notification destination in step 820. Preferably message information is not cached in the enforcement middleware, and so the information is destroyed in step 825. If a message queuing mechanism is required then it is preferred that dedicated utility services are implemented for this purpose.

Figure 7:
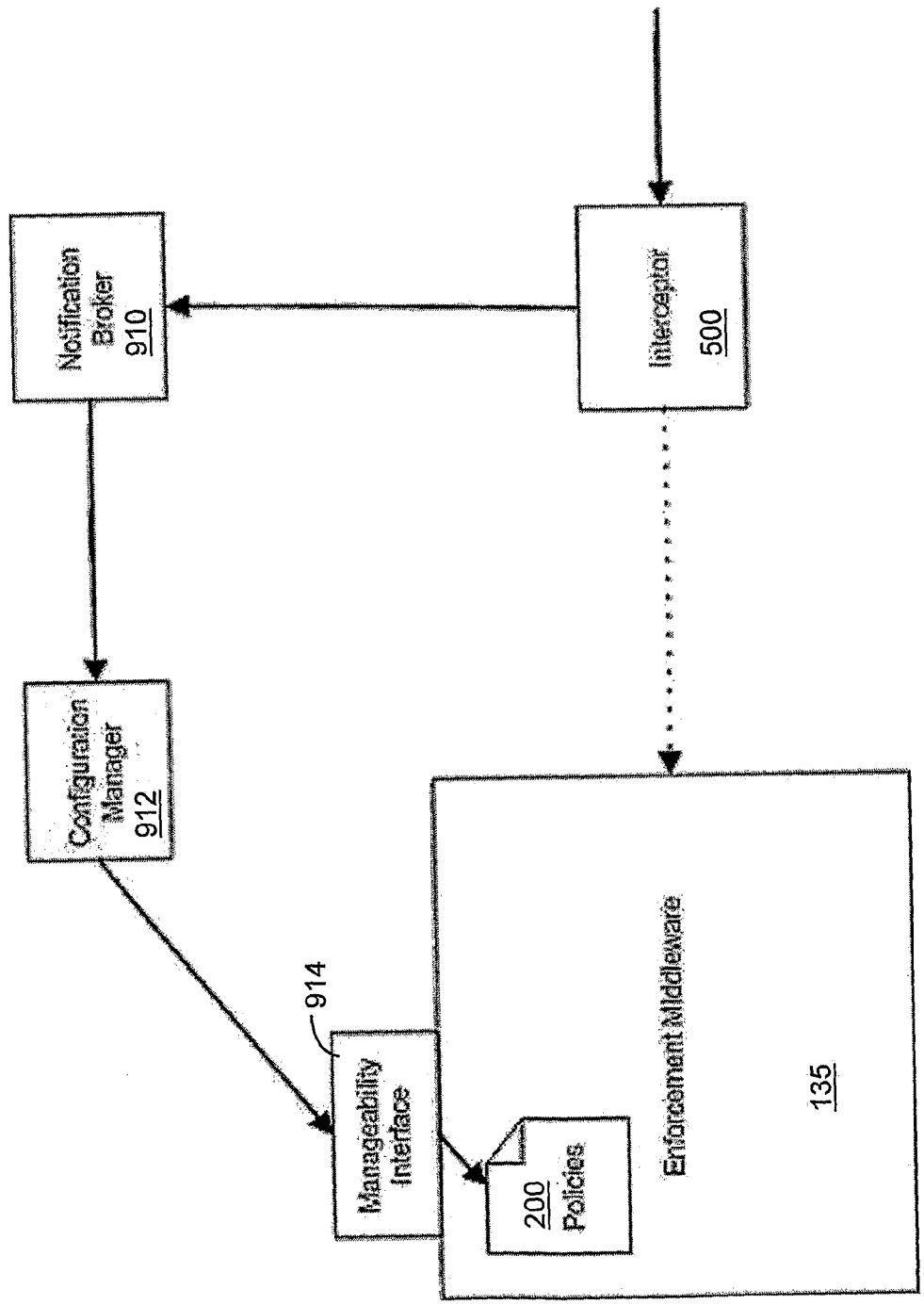
FIG. 7 is a block diagram showing the system components responsible for security configuration adaptation in response to changing requirements.

More generally, the enforcement middleware is responsible for taking appropriate actions such as to stop processing, to identify the source of the fault and to generate an informative fault messages. There are several reporting options possible. In a preferred embodiment of the present invention, however, a topics-based notification, with a dedicated Notification Broker Service (NBS), is used for distributing notifications about faults, as illustrated in the block diagram in FIG. 7. It will be understood that in the specific embodiment illustrated in FIG. 1, the notification broker and the configuration manager are both provided on the administrator's computer 16.

Exemplary topics include:
Notification per policy type
Notification per enforcement action type
Notification per USP reference or "real" address of external infrastructure service
Notification per interceptor in the pool
Creation of new enforcement point (i.e. an association between the enforcement middleware and a configuration instance for a specific resource being protected)
Activation and deactivation notification
Update notification
Fault notification
Destruction notification
Generic notification about an enforcement related event The use of topics based, brokered notification for managing enforcement points typically implies the following requirements to a preferred baseline infrastructure:

All notifications are typed and are classified in accordance with a classification (or an ontology)

Once an enforcement point is created it registers with the notification broker as a source/publisher of notifications Administrators and management services register with the notification broker as consumers of specific topics of notification from the group of enforcement points they manage The NBS mediates all notifications and matches publisher and declared topics to consumer; it may also consider a sub-class structure of a topics hierarchy, if available, in order to improve the intelligence of the notification distribution Change of the enforcement middleware meta-model may change the enforcement action types and USP references used in ECP, USP and IRP. When this meta-model is changed the notification topics and subscriptions typically need to be updated accordingly.

Different management services may have access to different aspects of the policy framework of the enforcement middleware. The NIBS is typically an infrastructure Web service that accepts notifications about different exceptions within a particular domain as well as allowing eligible services to subscribe to a specific type of notification. A NBS allows subscribers to be notified when an event of a specific type occurs within the system.

Figure 8:
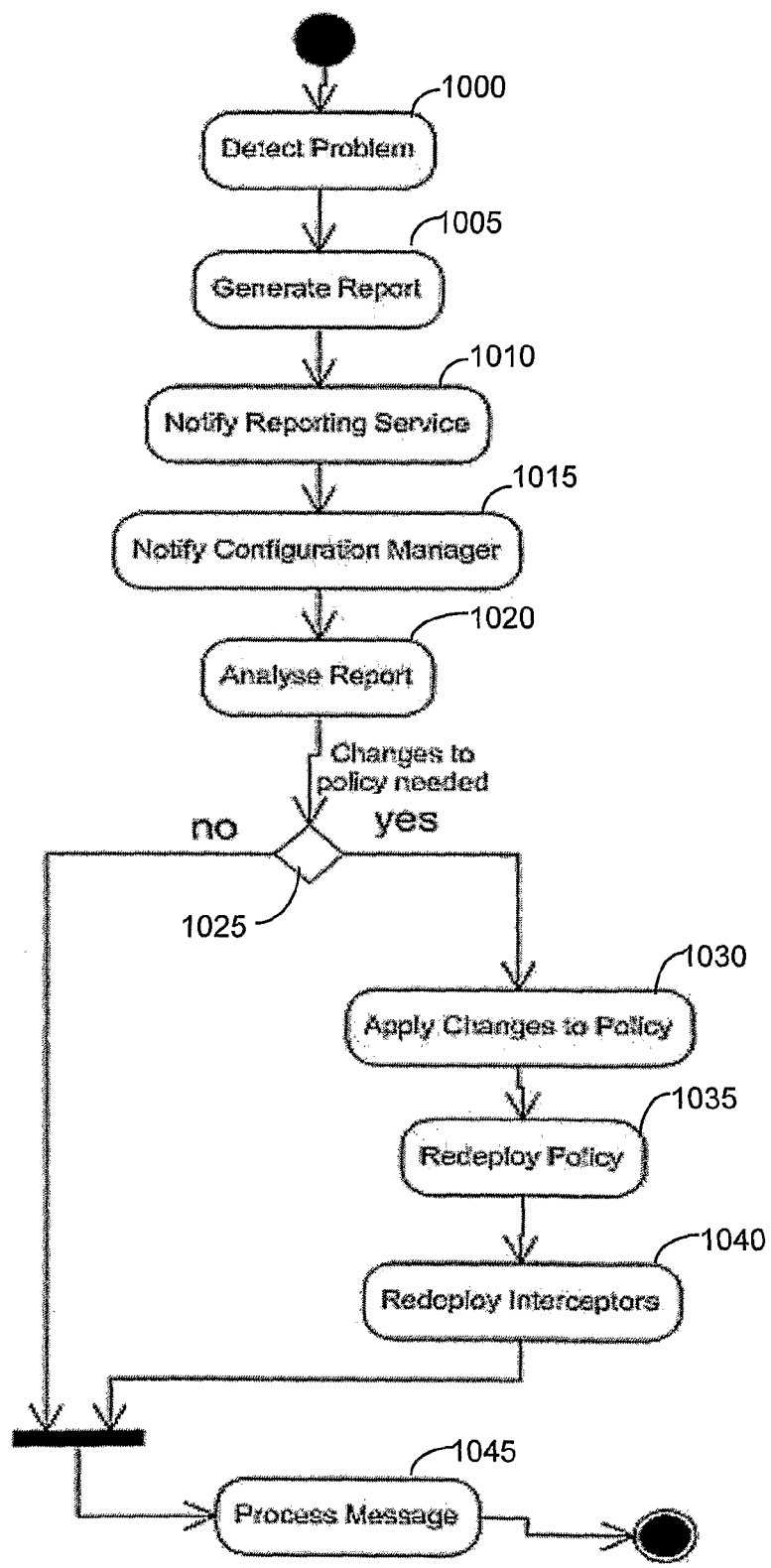
FIG. 8 is a flow chart showing an exemplary process of security configuration adaptation in response to the changing requirements.

Preferably, fault reporting is optimised by having management services subscribe only to fault topics relating to the aspect of interest and produced by the enforcement points they manage. A generic reporting scenario is illustrated in the block diagram in FIG. 7, and will now be described with reference to the flow diagram in FIG. 8.

In a first step 1000, a failure is detected by an interceptor 500. Next, in step 1005, the enforcement middleware 135 generates a notification, sends that to an appropriate reporting service, which submits a report to the NBS 910 in step 1010. The NBS 910 then notifies a configuration manger 912 about the event in step 1015. The configuration manager 912 is another Web service possessing capabilities and relevant permissions to configure relevant policies as well as implement manageability communication protocols.

Based on an appropriate internal supervision policy, the configuration manager 912 analyses the notification in step 1020 in order to determine whether the problem requires an update to any policy. If an update is required according to step 1025, the configuration manager 912 can update a configuration policy, for example, the ECP 205, in step 1030. Next, the revised policy is redeployed in step 1035 and, if necessary, updated or new interceptors are redeployed in step 1040. This update will have an immediate effect and is intended to influence the way interceptor chains are constructed in future. In either case, of update or no update, the process ends in step 1045 with the message being processed (to the extent that is possible), or an error is reported.

According to preferred embodiments of the present invention, management of the enforcement middleware is decoupled from the enforcement point itself. The overall management framework of the enforcement middleware includes:

- Managing the life-cycle of an enforcement point instance, that is of the logical association between the enforcement middleware and the current enforcement configuration for protecting a particular resource or network service,
- Configuring the enforcement middleware, and managing the life-cycle of a configuration including its update and destruction,
- Expanding the enforcement middleware with new interceptors, or removing existing interceptors,
- Distributing management-specific notifications that may trigger new or confirm the completion of previous management actions.

Thus, the same enforcement middleware can be used to protect a number of different resources offered by the same or by different providers. Also some aspects of the enforcement middleware configuration (for example, the ECP) are specific to each resource being protected whereas others (for example, the IRP) can be common for each instance of enforcement middleware. Consequently there may be several administrators or management services with separate management concerns and which can manage some aspects of the enforcement middleware only. The concept of an enforcement point is used as a logical abstraction that encapsulates all aspects of the enforcement middleware that relate to a resource being protected. The enforcement point instance is a logical entity that is represented as the association between the enforcement middleware and a configuration instance (ECP, IRP, USP, and CEP) that is put in place for protecting a specific resource.

Each endpoint instance is virtualised as a service in the control plane. That is, an endpoint instance exposes dedicated management interfaces to administrators and management services and implements the process for setting and updating its configuration, as illustrated in the flow diagrams in FIG. 9 and FIG. 10, which are described hereinafter.

The management interfaces exposed by an enforcement point instance can be presented either as a part of the management interfaces of the resource being protected or as a part of the management interfaces associated with a network node. According to present embodiments, the former option, that is being part of the management interfaces of the resource being protected, is used if the enforcement point is deployed between the resource virtualisation endpoint and the resource. In contrast, the latter option, that is being part of the management interface of a network node, is used if the enforcement point is deployed into an intermediary node. Notably virtualisation at the management plane does not necessarily imply visibility at the data-plane. It may be the case that the enforcement point is identifiable by management services which can interact with it (control-plane visibility) but it remains fully transparent as far as the protected resource and its clients are concerned (data-plane transparency). An alternative form of virtualisation is to expose the management interfaces to one or more enforcement points that have been remotely deployed as a part of the management interface of the resource being protected and then program them to pull all updates and push all notifications via these interfaces.

In any case, according to present embodiments, the means of accessing and updating ECP, IRP, USP and CEP are kept separate and distinct endpoint references, which are used in order to refer to the management interfaces exposed by different enforcement point instances.

The following are the main phases of an enforcement point management life, cycle according to preferred embodiments of the present invention:

- Create enforcement instance. This is achieved by explicitly registering a new configuration (defined by the ECP, IRP, USP and CEP) with the enforcement middleware. The ECP and CEP have do be distinct while the IRP and USP may be shared among multiple enforcement point instances over the same enforcement middleware.
- Destroy enforcement instance. This is achieved by explicitly cancelling the association between an existing configuration (defined by the ECP, IRP, USP, and CEP) and the enforcement middleware. The destruction of an enforcement point instance necessitates the deletion of the corresponding ECP and CEP instances.
- Update enforcement instance. This is achieved by updating the content of ECP, IRP, USP and CEP or changing the pool of interceptors as described hereinafter.

As already mentioned, the enforcement point itself is virtualised as a manageable service at the control plane, that is, it exposes dedicated management interfaces to administrators and management services. These interfaces permit the following configuration actions to be performed on the ECP, USP and IRP of an enforcement point:

- Load configuration,
- Activate configuration,
- Update configuration,
- Deactivate configuration, and
- Destroy configuration.

Figure 9:
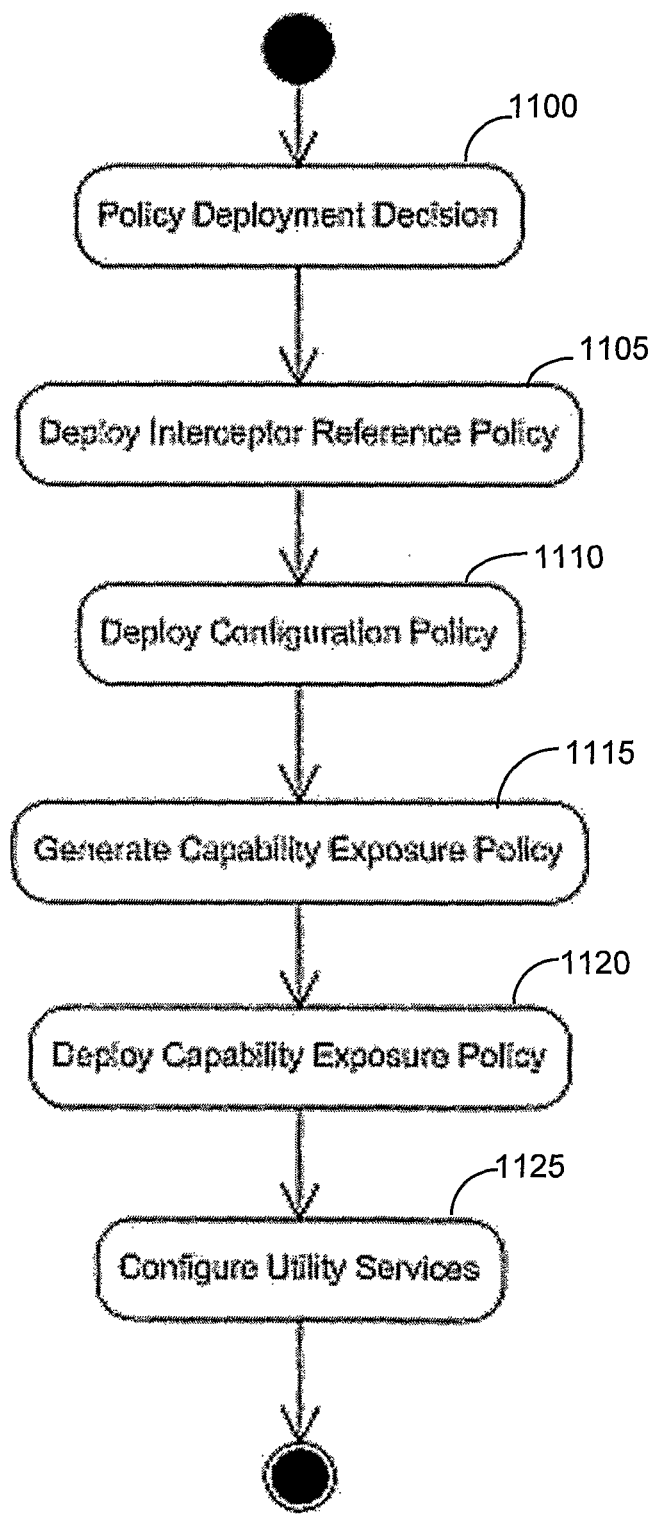
FIG. 9 is flow chart showing the process of policy deployment within the system according to the first embodiment.

The actual policy deployment process is illustrated by the flow diagram in FIG. 9. According to embodiments of the invention, the process is divided into six sequential stages. This process is initialised in step 1100 by a policy deployment decision which could be scheduled, associated with the deployment of a new service, or triggered by some event in the system.

The second stage in step 1105 is concerned with the deployment of the IRP. If the enforcement middleware is deployed locally, the IRP is deployed with the software package containing the actual enforcement middleware software (i.e. in the first embodiment illustrated in FIG. 1, the IRP might be included on the CD-ROM C).

The next stage in step 1110 is concerned with the ECP deployment. This is done by an authorised entity, for example an administrator or a management service, via a dedicated interface (in the embodiment of FIG. 1, via the administration computer 16). Notably different endpoint instances can associate with different ECP instances and therefore have different administrators or management points authorised to update them, even if they relate to the same enforcement middleware. This separation of concerns allows the enforcement middleware to protect several services from different providers and offer the capability to each service provider to administer the service-specific aspects that relate to the protection of their own network service or resource.

Once ECP is deployed, the public CEP has to be generated in step 1115 for the particular resource being protected. The CEP is derived by selectively extracting specific information from the ECP, as already explained. The CEP is then deployed in step 1120.

Finally, in step 1125, the USP can be configured via a dedicated management interface 420 by an authorised entity, for example an administrator or a management service. Notably, the separation of concerns between ECP and USP allows for separate administration of the two aspects. In particular, there can be scenarios where the resource provider is authorised to configure the ECP but only an administrator associated with the owner of the enforcement middleware is authorised to configure the USP.

The enforcement middleware 135 according to embodiments of the present invention also provides an interface 425 which allows an authorised entity to deploy and register new or updated software packages, for example containing implementations of interceptors, which defines the interceptor pool.

Figure 10:
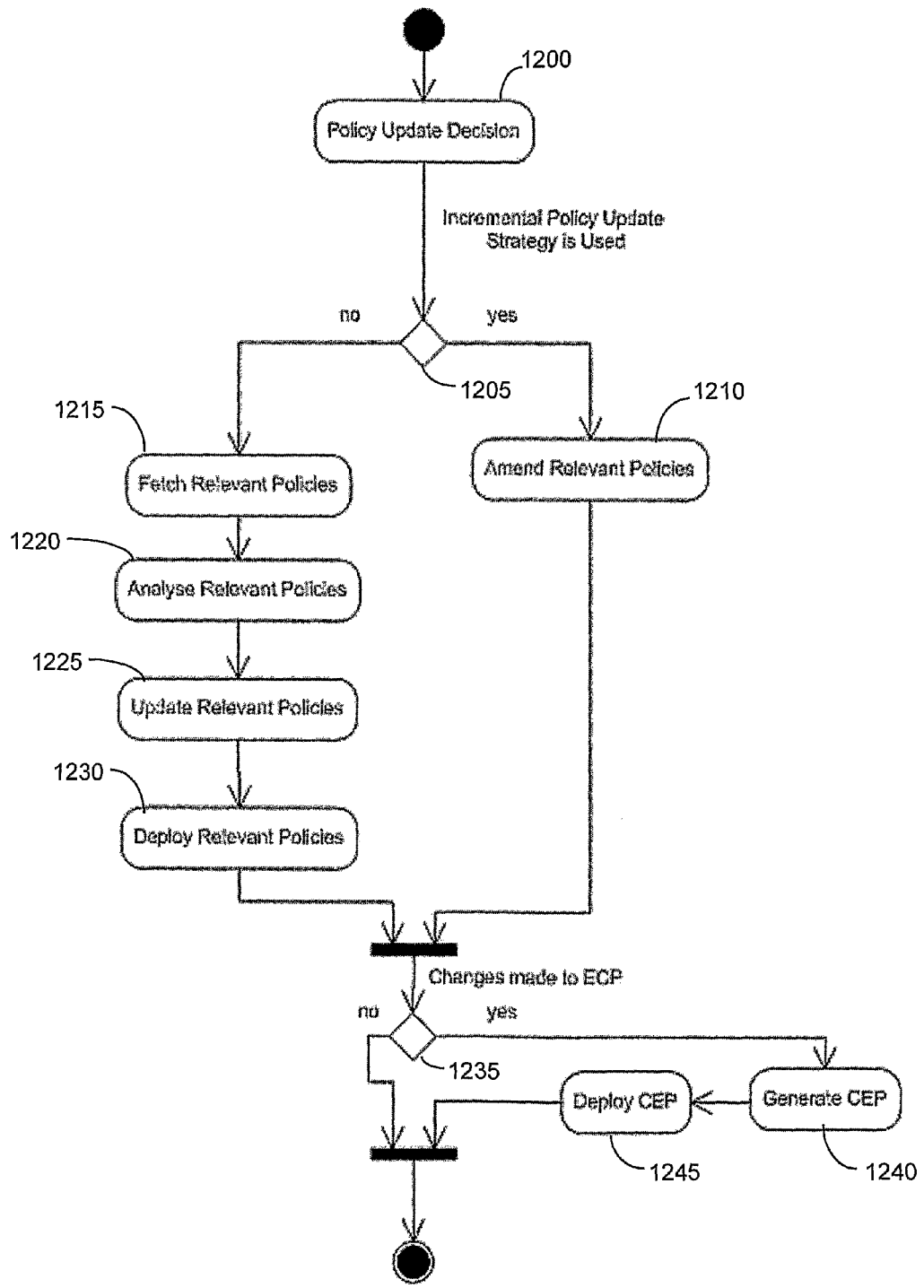
FIG. 10 is flow chart showing an exemplary process of security policy updating.

Policy updating will now be considered in more detail with reference to the flow diagram in FIG. 10.

The policy update process takes place within the system when already deployed policies have to be amended to incorporate certain changes. The update is performed by an authorised management entity via dedicated manageability interfaces (420, 425 & 430). Only the ECP 205 and USP 215 can be updated via this particular mechanism.

As has already been stated, the IRP 210 is typically supplied with the software package containing the enforcement middleware and cannot be updated unless the package (and the interceptors) is redeployed. This is preferably done to preserve dependencies between enforcement actions and classes containing implementations of these actions.

The CEP 220 cannot be updated via manageability interfaces since it is generated automatically upon the deployment or update of the ECP 205.

According to a first step 1200, a policy update decision is effectively a process created by some (human or software) entity within the system, which triggers the process of the policy update.

There are two strategies for enacting the policy update process—incremental and full—and the choice between the two is made in step 1205.

An incremental update, in step 1210, means that the existing policy is updated (or amended) without retrieval. This update process can be used then no analysis of the existing policy is required. A good example of the incremental update could be the changes made to a USP, wherein the USP itself contains addresses of additional infrastructure services used by the enforcement middleware. For example, in situations where the only changes that are required are the address of a new token service the incremental approach can be applied.

However, in some cases management the entity might have to perform some checks on the existing policy in order to make sure that the changes to the policy are going to make sense and adequately address new security requirements. In this case, simply amending the policy would typically not be sufficient (or sensible). A typical example of such situation is the updates are performed on the ECP as such. In such cases a full update is typically required.

A full update effectively means that whatever policy is updated, it is first fetched in step 1215 and analysed in step 1220 to assess its current state and then the policy is updated in step 1225.

Unlike for an incremental update, a full update typically requires that a policy is updated offline and then re-deployed in step 1230; where "offline" means that updates are dealt with by an authorised management entity.

In step 1235, if during the policy update process some changes were made to ECP, then in a next step 1240 the CEP has to be regenerated and redeployed, in step 1245, in order to ensure that the changes made to any security capabilities of the protected resource are adequately represented publicly.

Finally, the policy update process (FIG. 10) ends.

In the above, advantageously, the configuration of the enforcement middleware can be changed with immediate effect and without the need to redeploy or restart the protected resources or any other part of the system.

Figure 11:
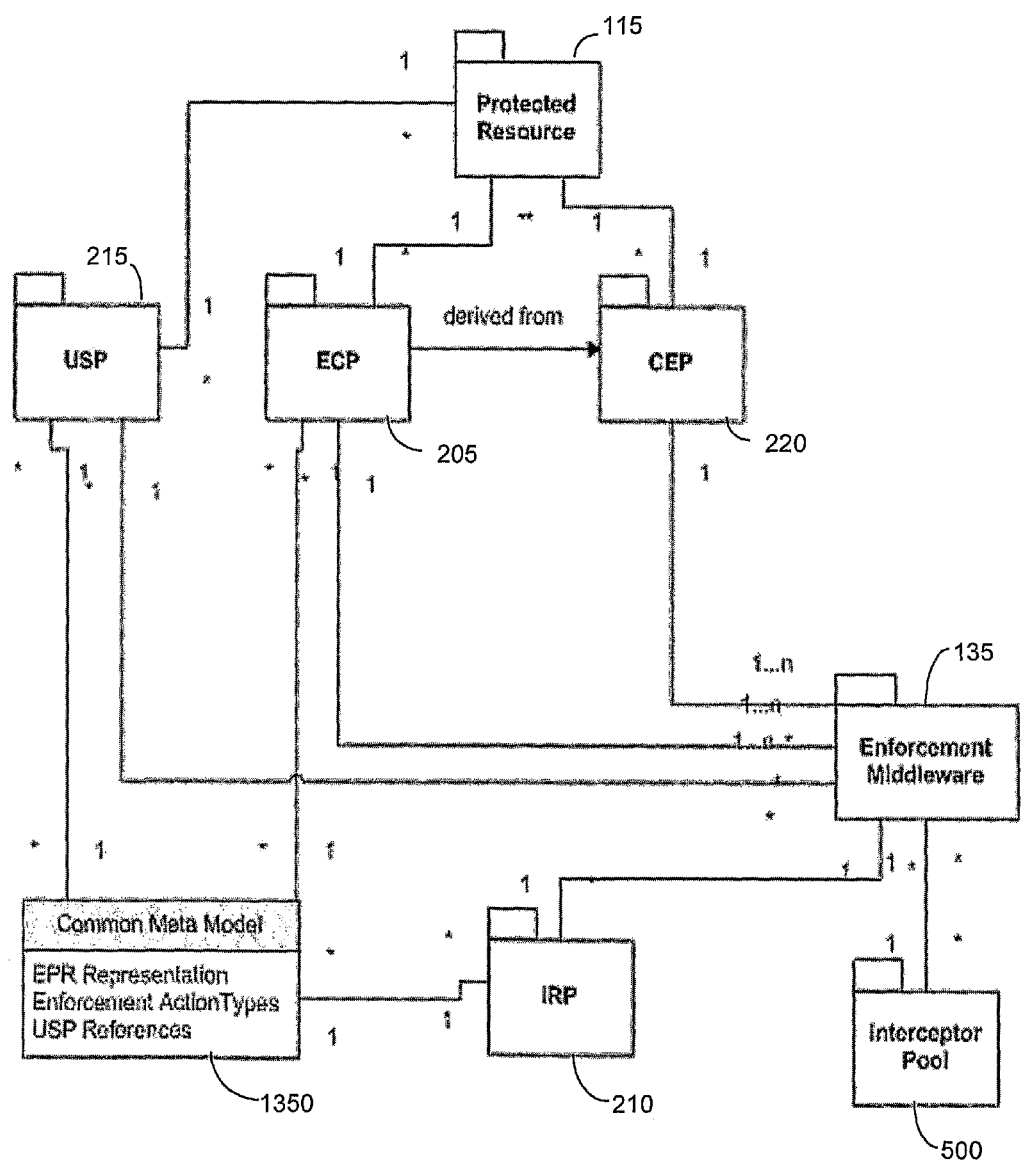
FIG. 11 is a block diagram showing relationships and cardinalities between different system components.

The block diagram in FIG. 11 illustrates a preferred configuration and implementation of an embodiment of the present invention. In particular:

one ECP 205 instance is generated per protected resource/network service 115 one CEP 220 is derived from the ECP 220 per protected resource/network service 115 one USP instance 215 is generated per provider whose resource 115 is protected by the enforcement middleware 135 one IRP instance 210 is generated per enforcement middleware instance 135 one interceptor pool 500 is built per enforcement middleware instance 135 the ECP 205, USP 215 and IRP 210 share a common meta-model 1350 that describes:

a common endpoint reference representation for remote services or resources common enforcement action types that are used in ECP 205 and IRP 210 common USP "static" references that serve as rigid local identifiers of respective auxiliary infrastructure services that may need to be invoked.

As already mentioned the foregoing description provides only one possible policy framework for the enforcement middleware. Various alternatives are possible ranging from defining one IRP, one USP and one aggregate_ECP per enforcement middleware instance to defining one ECP and one IRP and one USP per protected resource/network service or even per service operation or per protected service endpoint. The choice between alternatives depends on the architecture of the embodiment.

According to alternative embodiments, it would be possible to aggregate all ECP instances into an aggregate ECP, which will be referred to for convenience as ECP*. The aggregate ECP* is produced by simply aggregating the ECP for each protected resource and introducing a choice element at the beginning of ECP*, which explicitly references the choice condition, and the ECP* is updated whenever a new protected resource is introduced or, indeed, whenever any ECP instance of the protected resources is updated. Then, in essence, using ECP* is equivalent to using a collection of ECP with the same choice function. This is achievable because:

The interceptor chain is configured on a per message basis; and

The interceptor chain is instantiated after or during the ECP evaluation.

Notably, introducing an aggregate ECP* without loosing dynamicity is possible only because no a-priori fixed chaining of interceptors is assumed, and therefore different branches of ECP* can dictate internally consistent chains of interceptors that may legitimately contradict each other, if needed. However, managing concurrent updates to independent parts of an ECP* can be more difficult than managing updates to independent ECP instances. Furthermore, in many applications, different administrators may have the right to administer different ECP instances.

Similarly, it is also possible to decompose IRP and USP to fragments that include only the interceptor references and utility services used in the context of evaluating the ECP instance per protected resource. The main constraint is that updates to USP and IRP may interfere with the evaluation of ECP instances for other protected resources and therefore an appropriate non-interference mechanism (such as a datalock) will have to be introduced in order to address this risk.

The operation of the system of FIG. 1 will now be described by way of example.

An on-line flight reservation service, offers a different user-experience, defined by different endpoints, for normal and frequent flyers. In this case, a different set of policies is enforced at those endpoints. The system comprises client side and server side systems, where the client system is typically a personal computer belonging to (or accessed by) a customer and the server system is usually a server (or network of servers) belonging to, or controlled by, the flight booking agency. In the present case, both the client and the server systems are protected by separate security measures, of which at least the system protecting the server comprises enforcement middleware according to embodiments of the present invention. Preferably, though, both the client and server sides are protected by enforcement middleware according to embodiments of the present invention.

For both services, relating respectively to normal and frequent flyers, common interceptors are applied to making an access control decision (for example, "is the user allowed to make a booking?"), encrypting and signing a message (for example, to ensure authenticity and confidentiality). In either case, the (or the last) interceptor, at the client side, applies transport level routing to the message. By sending the credentials of an on-line user in the message to a supporting service, the service can determine whether the user sending this request is entitled to access the frequent flyer program or not. Depending on the information obtained, the service sends the message either to the frequent flyer or the standard reservation endpoint. The two endpoints exposed by, the service process the message differently.

The endpoints at the server side select the appropriate interceptors based on the service being requested (say frequent flyer service), the contents of the message and the context of the interaction (for example, transaction state).

In this example, the server side enforcement point has an ECP stating that a digital signature of the whole message body is obligatory and that encryption of the user addresses and credit card details are obligatory. Encryption of any other message content is optional. Regardless of the message content the enforcement point will attempt to validate the signature of the message body by invoking signature verification handlers that match the algorithms used by the client. If validation fails or the message body is not signed, this will cause a validation fault. If there is information about the user's address or credit-card details it will expect this information to be encrypted (otherwise produce a fault) and will attempt decrypting it. Any other signatures and encrypted elements will be dealt with as they appear in the message but no fault will be caused if none of them is found. Overall the structure of the message determines the order by which the handlers are invoked—within the constraints of the ECP policy.

The enforcement point at the frequent flyer service might contact additional "utility" services in order to assist the operation of the service. Examples of such services include a service to validate the user's credentials, or to fetch the user's credit card details automatically (for example, using the validated credentials provided) or to determine if the user is authorised to query a database to present the user with a list of preferred hotels, which may offer preferential rates to frequent flyers. The action made at each time depends on the contents of the user request (for example, payment, flight-booking, hotel-search request, etc.) and the state of the transaction enacted. That is, the actual chain of actions performed by the corresponding enforcement points that intercept messages between a client and a flight reservation service will be different if the content of each message and the context of the transaction within which the message is sent change.

On the client side this scenario demonstrates how the interceptors can be used to distinguish between users and send them different endpoints according to different attributes provided with the credentials. It should also be noted that in order for the transport level routing, user credentials must be added to the message prior to calling an appropriate routing interceptor. (This may involve invoking a utility service that is responsible for validating or exchanging a client's credentials). This interceptor dependency is resolved by the policy that determines the order of interceptors in a respective chain.

Next, suppose a set of users has been caught abusing the system (for example, booking with stolen credit cards) and it has been decided that action needs to be taken other than simple denial of service (potentially leading to prosecution). Furthermore there is an interceptor in the interceptor pool available that is able to send notifications to another utility service, which is a third party audit service that is used for gathering forensic evidence for prosecution. The presence of such a malicious user can be detected by the reservation system, for example because the payment has not been successful (card blocked). By simply updating the ECP policy, so that this interceptor can be used, and the USP policy, so that the selected audit service is invoked if the malicious user attempts to pay with a stolen card, the system can notify the third party audit service and trace the actions of the malicious user. The policy can also be adapted so as to delay response, deny access, etc, as appropriate in the circumstances. This adaptation, most conveniently, due to the flexibility of the present invention, does not require any changes in the functionality of the application system (reservation service or billing service) or of the third party audit service.

Notably, and in contrast to the following example, here there is no need to update the public CEP since the use of the audit service does not offer an alternative communication option nor does it require the provision of any additional information by the service clients. Unless they have agreed otherwise in their service usage contract, all service clients will be unaware of this change.

Now, assuming there was a security breach in the type of credentials used by the system. In particular a group of intruders could fake credentials of legitimate users. First the USP can be changed with the address and contact details of a new more secure security token service which is capable of providing more advanced credentials in better protected security tokens.

Furthermore assume that using the new tokens allows the system the possibility to apply 256-bit encryption and this is a new capability that was not considered in the past where only 128-bit encryption was used. In order to take advantage of the new tokens, the pool of interceptors is updated to include interceptors that can use these new tokens with hew algorithms for signature and encryption in addition to what was previously used. Upon the introduction of the new interceptors, the IRP has to be updated so that the new interceptors can be invoked. The security administrator is given a choice: either to introduce the new encryption and signature options as new capabilities or to introduce them as updates/replacements of the existing ones (since they are backwards compatible). In the former case (requiring a full update) new capability identifiers will have to be introduced to the IRP, whereas in the latter case (requiring only an incremental update) only the mapping of the existing identifiers for signature and encryption to the new interceptors will be updated.

Note that the ELP is loosely coupled with the rest of the system and it typically always needs to be changed if the implementation of the enforcement actions or configuration of the preferred infrastructure services has been modified.

In contrast to the previous example, these changes will be reflected in the updated public CEP, which is generated out of the private ones in order to allow service clients to take such changes into account. In particular, the public policy will be updated in a statement identifying the new type of tokens that are accepted and the option to use 256-bit encryption. No other information will have to be disclosed.

Other Embodiments i) The above embodiment was based on a XML-processor based design and no tailored WS middleware was used. However, alternative embodiments use tailored Web Services (often abbreviated to WS) middleware—for example SOAP-based web services middleware implementations such as Apache Axis, Microsoft NET WSE, IBM Websphere or BEA Weblogic. In yet other embodiments, no service container model is used—for example embodiments can be REST based lightweight implementations.

ii) The above embodiment had the enforcement middleware 135 on the same host as the protected resource 115. In other words, it used a standalone architecture which will now be expanded upon with reference to FIG. 11

1. Standalone Endpoint (Endpoint Enforcement):

A standalone architecture assumes that all of the components of the enforcement middleware are implemented and deployed as part of the same software package, for example as illustrated in FIG. 11.

The schematic block diagram in FIG. 11 illustrates a host computer system 300 (for, example operating under a UNIX, Linux or Windows operating system) on which there is a protected resource process 115 in communication, via one or more application interfaces 310, with an enforcement middleware process 135. The block diagram also illustrates a policy configuration interface 320, an enforcement middleware deployment interface 325 and an infrastructure services configuration interface 330, each of which is used for configuring the behaviour of the enforcement middleware 135. According to the diagram, SOAP messages 335 are received by the host system 300 at an enforcement point 340 of the enforcement middleware 135. The messages 335 are then processed by the enforcement middleware 135 and, if deemed appropriate, passed to the protected resource 115.

This single host option is especially beneficial in the situations when a recipient of a message and the enforcement middleware that processes the message are placed on the same host and no routing is required. Then the Enforcement middleware is plugged directly into the message processing engine, which provides the core capability of the implementing Transport protocol (for example, TCP or HTTP) and XML document and SOAP message processing on a given operating platform. The message processing engine, in effect, provides a Web service wrapper for the protected resource. In this case:

Enforcement actions take place between the protected resource 115 and a network endpoint that is exposed on the host implementing the resource virtualisation, which is at the host where the network service exposing the resource has been deployed.

The enforcement middleware 135 is typically transparent, that is, not visible or apparent, to both the client and the protected resource 115.

Figure 12:
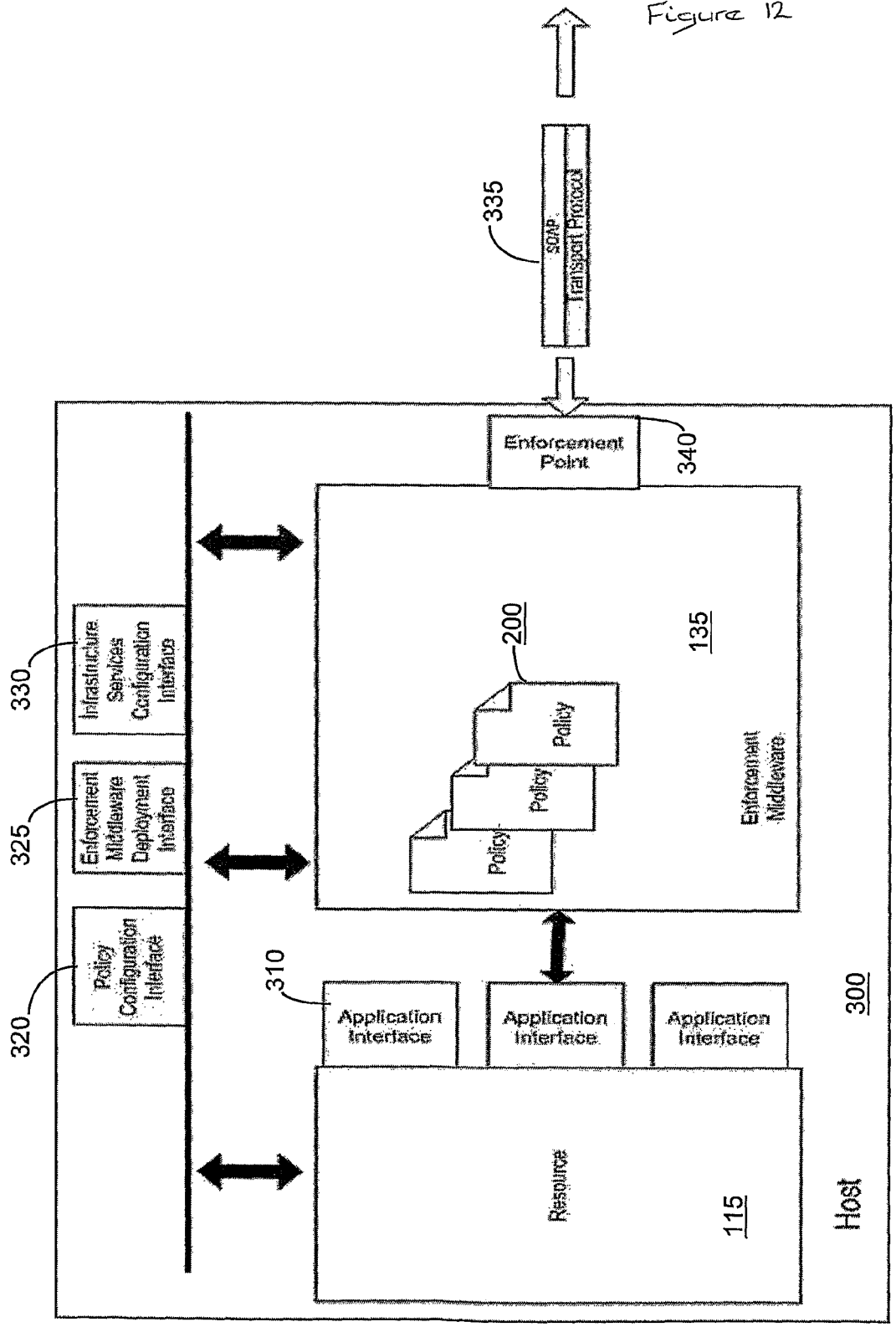

In alternative embodiments, other architectures may be used—for example:

2. Standalone Intermediary:

A second design option for the realisation of embodiments of the invention is to have an enforcement middleware 135 on a separate host (Host B 400) from the protected resource 115 (on Host A 403), as shown in FIG. 12. In this case the enforcement middleware 135 is deployed as a so-called standalone intermediary. As in the previous case all interceptors (not shown) are typically implemented as part of the same software package. The enforcement middleware 135 deployed in this fashion can either be visible on the network and have its own network address or take advantage of protocol binding techniques and be transparent to both the client and/or the resource at the service/application level of the network. Examples of standalone intermediaries include SOAP intermediaries, which are visible to the application network and HTTP or TCP routers which are specific to intercepting SOAP messages over HTTP or TCP, respectively, and are transparent at the SOAP layer but visible at the HTP or TCP layers, respectively. The embodiment of FIG. 1 could be altered to use a standalone intermediary architecture by introducing a firewall computer between the customer's PC 10 and the web-server computer 12 and loading the core enforcement program and local interceptors from CD-ROMs C and D onto the firewall computer and executing them there rather than on the web-server computer 12.

3. Distributed Deployment Architecture:

A third design option (which is not shown in the drawings) is a distributed architecture, which is operated by aggregating functionality of different distributed interceptors implemented as SOAP nodes, the details of which are discussed in more detail hereinafter. In this case the SOAP message is routed via a sequence of SOAP nodes where each one of them enforces a particular action on this message. As in the case of standalone SOAP intermediary described with reference to FIG. 4, the individual interceptors can either be visible on the network or utilise protocol binding mechanisms to achieve transparency.

Figure 13:
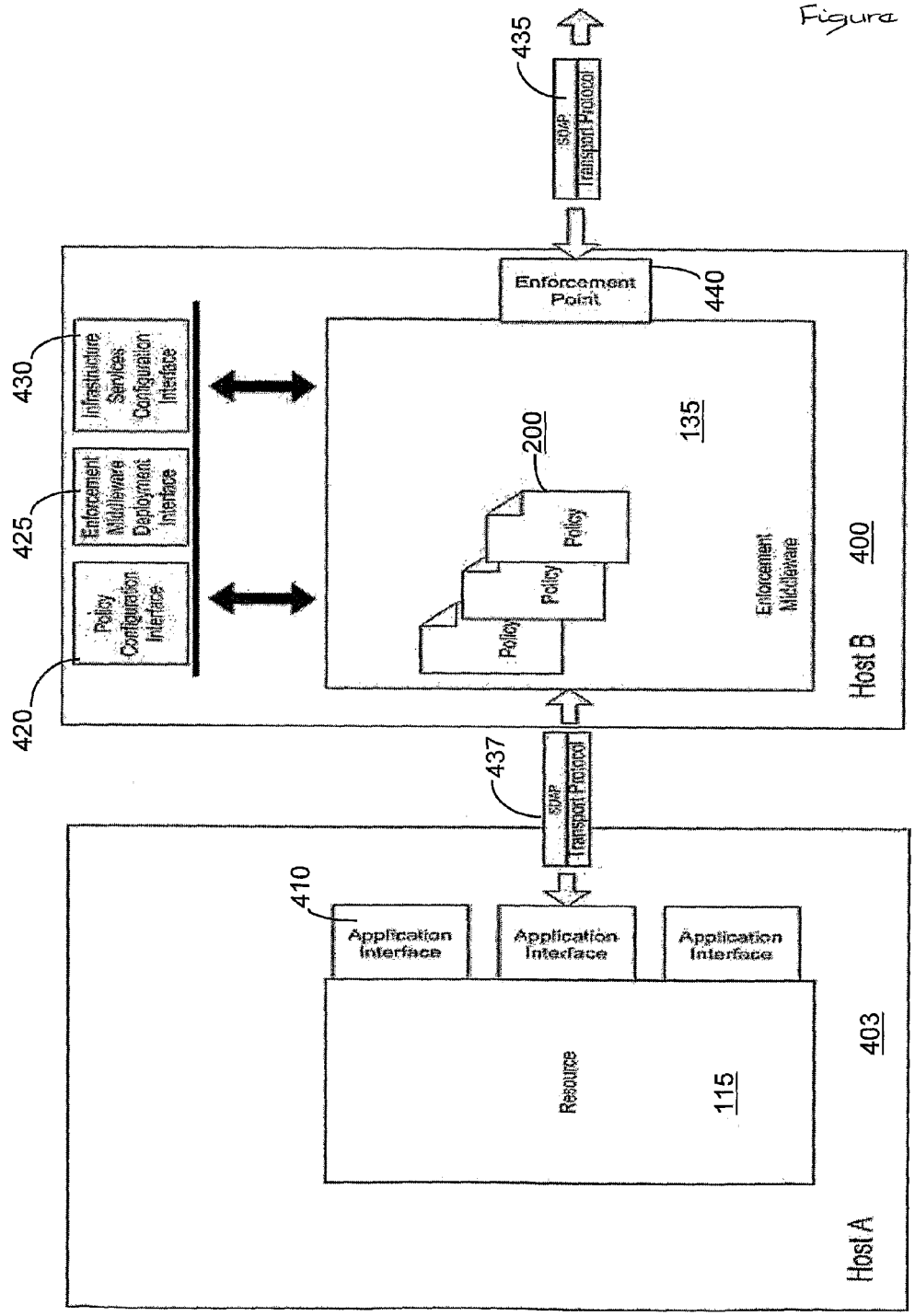
FIG. 13 is a block diagram of a system architecture according to a second embodiment with enforcement middleware deployed remotely with respect to a protected resource.
Figure 14:
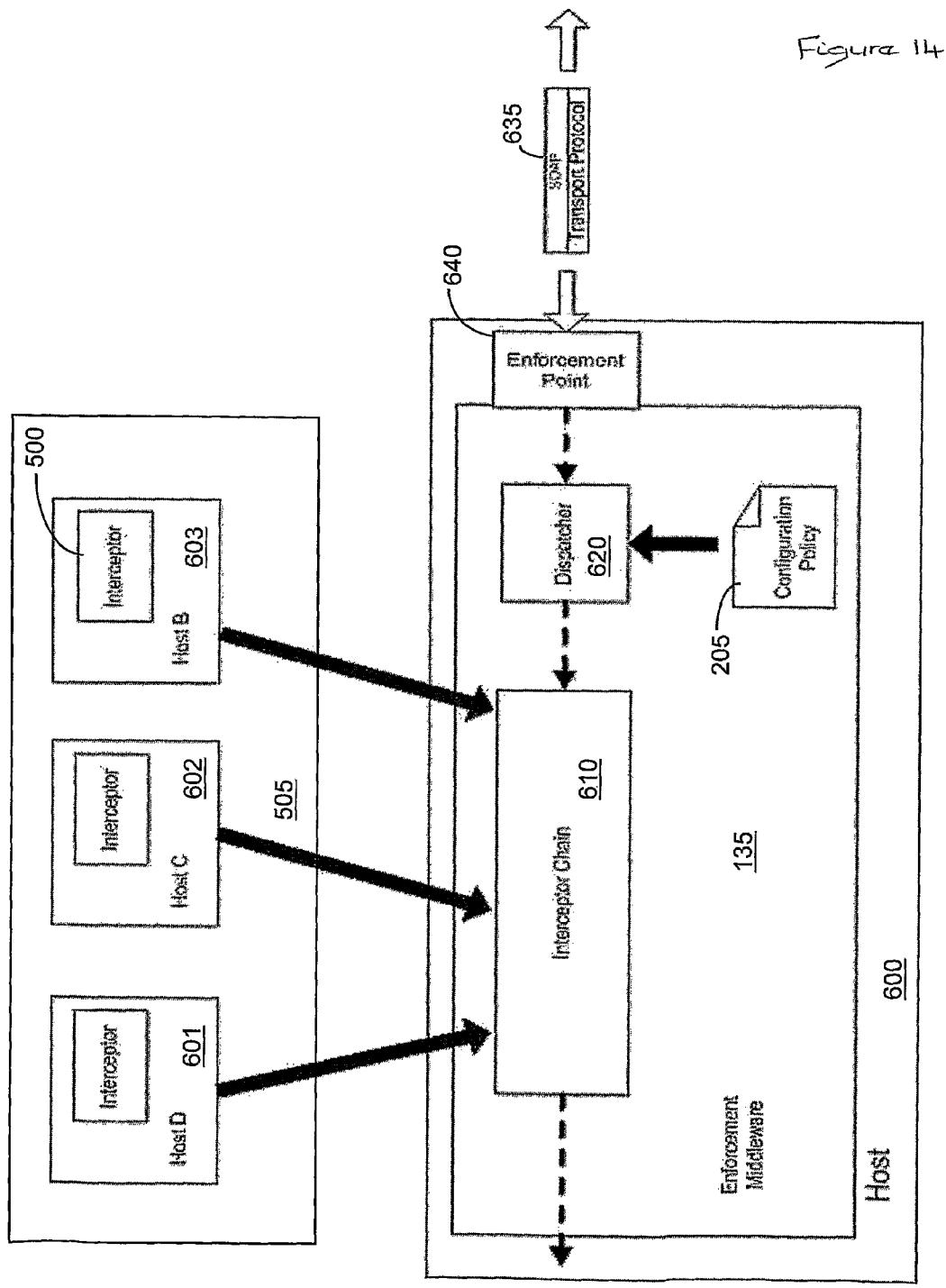
FIG. 14 is a block diagram showing a process of security enforcement in a third embodiment where an interceptor chain is formed out of interceptors implemented as SOAP nodes.

In many cases a selected practical architecture is a combination of the distributed option and the option adopted in the first embodiment or the above standalone intermediary alternative. Such a hybrid deployment is a particularly suitable choice when the software package containing the enforcement middleware at a node supports some but not all of the enforcement actions and it is subsequently extended to use remote interceptors that are deployed within other distributed SOAP nodes. A SOAP node is an intermediate entity, along a SOAP message path, which facilitates the exchange of SOAP messages. Typically, a SOAP node deals with routing enforcement, and may have additional enforcement behaviour that includes interceptor functionality in addition to controlling the flow of the SOAP traffic.

iii) Interceptors in a chain may be deployed locally, according to the example illustrated in the diagram in FIG. 1 or they can be distributed over a network to and be invoked remotely. If the policies 205 enable remote interceptors to be invoked, the dispatcher is able to import those interceptors when needed. This alternative architecture is illustrated in FIG. 13.

Various optional features of aspects and embodiments of the present invention are presented in the following numbered clauses:

1. A mechanism to dynamically combine enforcement actions based on the content of the message and conditions of a configuration policy.
2. A process describing the control flow of performing enforcement actions on an intercepted message by sequentially invoking interceptors which are configured just before they are executed.
3. A system and apparatus consisting of
   a. a pool of message interceptors which are deployed locally or at a remote network location
   b. a declarative policy that correlates each local or remotely deployed message interceptor from a pool of interceptors mentioned in (3.a) above with an assertion type denoting an enforcement action
   c. a declarative policy that describes conditions based on the type of content and protocol context of an intercepted message that determine a sequence of enforcement actions, where the enforcement actions are a subset of the actions contained in (3.b)
   d. a mechanism for dynamically forming a chain of interceptors during the processing of an intercepted message, where the interceptors are selected from the pool mentioned in (3.a) above based on the content and protocol context of the intercepted message, the constraints set by the policy mentioned in (3.c) above and the correlation described in (3.a) above.
4. A system and apparatus that extends (1) above by
   a. extending the policy described in (3.c) with additional configuration parameters for the interceptors
   b. extending the mechanism described in (3.d) above by configuring the interceptors at the time they are invoked in the chain
5. A system and apparatus that extends (1) or (4) above by
   a. a declarative policy defining the network addresses or endpoint references of external services that can be invoked during the processing of an intercepted message by an interceptor in the chain
   b. uploading the information described in (5.a) above during execution of an interceptor in the chain in order to implement message exchanges with the network service at the network address or endpoint referenced in (5.a).
6. A system and apparatus that extends (1) or (4) above by separating instances of the policy mentioned in (3.c) or (4.a) based on whether they refer to a chain put in place to protect different network services or resources.
7. A system and apparatus that extends (1) or (4) above by binding each policy instance mentioned in (6) with the policy mentioned in (3.b) above into a configuration that is explicitly associated with the network service or resource that the policy instance mentioned in (6) relates to.
8. A system and apparatus that extends (5) above by binding each policy instance mentioned in (6) with the policy mentioned in (3.b) and (5.a) above into a configuration that is explicitly associated with the network service or resource that the policy instance mentioned in (6) relates to.
9. A method for generating a new declarative policy from each policy instance of claim (6) by selecting only the types of the message content or the type of the protocol-specific message context that is used as arguments for the conditions in the policies mentioned in (6) or (3.c) or (4.a) above,
10. A system and apparatus that extends (6) or (7) or (8) by introducing a new declarative policy that is derived by the policy of claim (6) using the method of claim (9).
11. A system and apparatus that extends (1) or (4) or (5) above by introducing dedicated management interfaces that allow an administrator or an authorised remote service to create, activate, update, deactivate or delete the policies mentioned in (3.b) or (3.c) or (4.a) or (5.a) above.
12. A system and apparatus that extends (7) or (8) above by introducing dedicated management interfaces that allow an administrator or an authorised remote service to create, activate, update, deactivate or delete the configuration mentioned in (7) or (8) above that is specific to the network resource or service endpoint in relation to which message interception is enforced.
13. The method of allowing different management agents to create, activate, update, deactivate the configurations mentioned in (12) above, each of which is associated with a different network resource or service endpoint served by the same enforcement middleware.
14. A method of generating notifications that are classified based on topics derived from the types of enforcement actions declared in policies mentioned in (6) or (3.c) or (4.a) above.
15. A method of generating notifications that are classified based on the intersection or union of the topics mentioned in (14) above.
16. A method of brokering notifications based on the topics, mentioned in (14) or (15) above.
17. A system and apparatus that extends (1) or (4) or (5) or (6) or (7) or (8) or (10) or (11) or (12) above by introducing:
   a. Generation of topics-based notifications using the method of claim (14) or (15)
   b. Topics-based brokerage of notifications using the method of claim (16)
   c. A topics-based notification broker processing notifications generated by the system.
18. A method for updating or redeploying the pool of message interceptors mentioned in claim (3.a) and consistently updating the policy mentioned in claim (3.b) and validating the update against the policies mentioned in claims (3.c) and (5.a).
19. A system and apparatus that extends (1) or (4) or (5) or (6) or (7) or (8) or (10) or (11) or (12) or (17) above by
   a. Introducing an interface that allows an administrator to redeploy or update the pool of interceptors mentioned in claim (3.a)
   b. Using the method mentioned in claim (18) in order to consistently update the corresponding configuration policies.
20. The embodiment of the architecture described in (1), (4) or (5) above in a software system or a network appliance processing XML or SOAP messages.
21. The embodiment of the architecture described in (1), (4) or (5) above in a message processing middleware.
22. The embodiment of the architecture described in (1), (4) or (5) above in a firmware of a network node such as a message router, a message hub or a firewall.

23. The embodiment of the architecture described in (1), (4) or (5) above in a computational component between the network endpoint of a service and the computational resource consuming or generating the intercepted messages.

To summarise the above description, methods and apparatus for controlling the operation of a distributed application using message interception techniques are disclosed. The message interception software is independent of the software components making up the distributed application. The message interception software processes messages by carrying out a series of actions set out in an interceptor chain configuration policy, that policy being selected on the basis of the contents of the intercepted message. The interceptor chain configuration policy is divided into a separate enforcement configuration policy which dictates what actions should be carried out on a message and in what order, and an interceptor reference policy which indicates references to interceptors which are suitable for carrying out the actions specified in the enforcement configuration policy. In this way, the behaviour of the message interception software (and thus the distributed application) can be updated whilst both the interception software and the distributed application are running without requiring the person updating the behaviour of the message interception software to deal with esoteric references to interceptor software routines.

The invention claimed is:

1. A method of processing a message during a message exchange in a distributed computing environment, the method including
   receiving a message and, on the basis of the content of the message and an enforcement configuration policy providing a specified set of conditions dictating what enforcement actions should be carried out on the message and what order,
   selecting a plurality of the enforcement actions, from available enforcement actions, to be applied in a particular order to the message,
   providing an association or mapping between enforcement actions and respective interceptors;
   identifying interceptors that correspond to each of the enforcement actions based on associations which are administrator-editable and
   deploying an ordered interceptor chain comprising the identified interceptors to apply the selected plural enforcement actions in the particular order,
   wherein, in response to a detection of a fault by a deployed interceptor, determining, based on the fault, if a policy update is required and responsive to the determination:
   a) updating the policy; and
   b) deploying the updated policy.

2. A method according to claim 1, wherein the conditions are associated with one or more of: selecting enforcement actions; ordering enforcement actions; and configuring enforcement actions.

3. A method according to claim 1, wherein the conditions depend upon an intended destination of the message.

4. A method according to claim 1, wherein the conditions depend upon additional identification information that is stored in the message.

5. A method according to claim 1, including configuring or adapting the behaviour of one or more interceptors or interceptor instances on the basis of the message.

6. A method according to claim 1, including configuring or adapting the behaviour of one or more interceptors or interceptor instances on the basis of an enforcement state.

7. A method according to claim 1, including configuring or adapting the behaviour of one or more of the interceptors or interceptor instances on the basis of at least one of:
   the content of message;
   the context of message;
   meta-data associated with message;
   results from previous interceptor instances;
   conditions under which the message is received; and
   an intended destination of the message.

8. A method according to claim 7, including configuring or adapting the behaviour of an interceptor or interceptor instance after the message is received.

9. A method according to claim 7, including configuring or adapting the behaviour of an interceptor or interceptor instance when the interceptor chain is deployed.

10. A method according to claim 1, including configuring or adapting the behaviour of an interceptor or an interceptor instance by at least one of:
    varying an input parameter;
    using information contained in the message to influence or provide an input;
    introducing a dependency related to an earlier interceptor;
    introducing a dependency related to a persisting enforcement state; and
    specifying an external service to be invoked.

11. A method according to claim 1, including dynamically loading and invoking each interceptor instance on receipt of the message.

12. A method according to claim 1, including inspecting the content of the message in order to determine specific functionality required of a respective interceptor instance.

13. A method according to claim 1, including selecting or deriving parameters from the message and using the parameters to invoke a specific interceptor instance of a respective interceptor.

14. A method according to claim 1, including selecting one from plural possible specified sets of conditions on the basis of the contents of the message.

15. A method according to claim 1, including updating associations or mappings between the enforcement actions and interceptors.

16. A method according to claim 1, including updating utility services that can be invoked during processing of the message.

17. A method of exchanging messages in a distributed computing environment, the method including for each received message
    selecting, on the basis of the content of the message and an enforcement configuration policy providing a specified set of conditions, a plurality of enforcement actions, from available enforcement actions, to be applied in a particular order to the message, the enforcement configuration policy dictating what enforcement actions should be carried out and what order,
    providing an association or mapping between enforcement actions and respective interceptors;
    identifying interceptors that correspond to each of the enforcement actions based on associations which are administrator-editable; and
    deploying an ordered interceptor chain comprising the identified interceptors to apply the selected plural enforcement actions in the particular order,
    wherein, in response to a detection of a fault by a deployed interceptor, determining, based on the fault, if a policy update is required and responsive to the determination:
    a) updating the policy; and
    b) deploying the updated policy.

18. A method according to claim 17, including, in between received messages, at least one of:
- updating the specified set of conditions
- removing or deleting an existing specified set of conditions;
- updating associations or mappings between the enforcement actions and interceptors;
- identifying utility services that can be invoked during processing of the message;
- updating utility services that can be invoked during processing of the message;
- updating one or more of the available interceptors; and
- providing a new specified set of conditions or updating an existing specified set of conditions.

19. A computer system arranged to process a message during a message exchange in a distributed computing environment, the computer system including:
- an input for receiving a message,
- an output for delivering a processed message,
- a computer-readable store, the store storing an enforcement configuration policy providing a specified set of conditions dictating what enforcement actions should be carried out on the message and what order,
- a computer-readable store, the store storing an association or mapping between enforcement actions and respective interceptors;
- a processing system having at least one processor, the processing system being arranged to inspect the content of a received message, on the basis of the content of the message and the conditions, identify a plurality of the enforcement actions, from available enforcement actions, to be applied in a particular order to the message, use associations to identify interceptors that correspond to each of the enforcement actions and deploy an ordered interceptor chain comprising the identified interceptors to apply the selected plural enforcement actions in the particular order, said associations being administrator-editable,
- wherein the processing system is further arranged to, in response to a detection of a fault by a deployed interceptor, determine, based on the fault, if a policy update is required and responsive to the determination to:
  a) update the policy; and
  b) deploy the updated policy.

20. A computer system according to claim 19, wherein said administrator-editable associations comprise a first declarative policy which correlates each local or remotely deployed interceptor from the pool of interceptors with an assertion type denoting an enforcement action.

21. A computer system according to claim 20, comprising a second declarative policy which describes conditions based on the type of content and protocol context of an intercepted message that determines a sequence of enforcement actions.

22. A computer system according to claim 21, comprising a unit configured to dynamically form the interceptor chain during the processing of an intercepted message, where the interceptors are selected from a pool of interceptors based on the content and a protocol context of the intercepted message, constraints set by the first declarative policy and a correlation described by the second declarative policy.

23. A computer system according to claim 21, including a third declarative policy which is editable by an administrator and defines network addresses or endpoint references of external services that can be invoked during the processing of an intercepted message by an interceptor in the chain.

24. A computer system according to claim 23, including a unit configured to upload the third declarative policy during execution of an interceptor in the chain in order to implement message exchanges with the external services.

25. A computer system according to claim 21, comprising a unit arranged to extend the second declarative policy with additional configuration parameters for the interceptors.

26. A computer system according to claim 21, comprising a unit configured to arrange the second declarative policy or an extended second declarative policy into instances, each associated with protecting a different network service or resource.

27. A computer system according to claim 26, comprising a unit arranged to bind each instance of the second declarative policy or the extended second declarative policy with the first declarative policy, in order to generate a configuration that is explicitly associated with a respective different network service or resource.

28. A computer system according to claim 27, comprising a unit arranged to bind each instance of the second declarative policy or the extended second declarative policy with a third declarative policy, which defines a network of addresses or endpoint references of external services that can be invoked during the processing of an intercepted message by an interceptor in the chain, in order to generate a configuration that is explicitly associated with a respective different network service or resource.

29. The system of claim 19, wherein said associations are administrator-editable at runtime.

30. The system of claim 19, wherein said associations are administrator-editable at deployment-time of the associations.

31. A non-transitory computer readable medium storing instructions, which upon execution by at least one computer, process a message during a message exchange in a distributed computing environment by at least:
- selecting plural enforcement actions, from available enforcement actions, to be applied in a particular order to the message on the basis of the content of the message and an enforcement configuration policy providing a specified set of conditions dictating what enforcement actions should be carried out on the message and what order,
- providing an association or mapping between enforcement actions and respective interceptors;
- identifying interceptors that correspond to each of the enforcement actions based on associations which are administrator-editable and
- deploying an ordered interceptor chain comprising the identified interceptors to apply the selected plural enforcement actions in the particular order,
- wherein, in response to a detection of a fault by a deployed interceptor, determining, based on the fault, if a policy update is required and responsive to the determination:
  a) updating the policy; and
  b) deploying the updated policy.

* * * * *